(12) United States Patent
Yoshida et al.

(10) Patent No.: US 8,743,006 B2
(45) Date of Patent: Jun. 3, 2014

(54) WIRELESS COMMUNICATION-IMPROVING SHEET MEMBER, WIRELESS IC TAG, ANTENNA, AND WIRELESS COMMUNICATION SYSTEM USING THE SAME

(75) Inventors: Takahiko Yoshida, Yamatokooriyama (JP); Masato Matsushita, Yamatokooriyama (JP); Haruhide Okamura, Yamatokooriyama (JP); Shinichi Sato, Yamatokooriyama (JP); Hiroaki Kogure, Tokyo (JP); Toshiharu Shimai, Yamatokooriyama (JP)

(73) Assignee: Nitta Corporation, Osaka (JP)

( * ) Notice: Subject to any disclaimer, the term of this patent is extended or adjusted under 35 U.S.C. 154(b) by 215 days.

(21) Appl. No.: 12/734,409

(22) PCT Filed: Apr. 9, 2008

(86) PCT No.: PCT/JP2008/057039
§ 371 (c)(1),
(2), (4) Date: Apr. 29, 2010

(87) PCT Pub. No.: WO2009/057335
PCT Pub. Date: May 7, 2009

(65) Prior Publication Data
US 2010/0231482 A1 Sep. 16, 2010

(30) Foreign Application Priority Data

Oct. 31, 2007 (JP) .................. 2007-284599
Mar. 31, 2008 (JP) .................. 2008-094405

(51) Int. Cl.
*H01Q 9/16* (2006.01)
*H01Q 1/22* (2006.01)
*G06K 19/077* (2006.01)
*H04K 3/00* (2006.01)
*H01Q 13/10* (2006.01)
*H01Q 1/52* (2006.01)
*H01Q 1/38* (2006.01)
*H01Q 7/00* (2006.01)

(52) U.S. Cl.
CPC ........ *G06K 19/07749* (2013.01); *H01Q 1/2225* (2013.01); *G06K 19/07786* (2013.01); *H04K 3/224* (2013.01); *H01Q 9/16* (2013.01); *H04K 2203/32* (2013.01); *H01Q 13/10* (2013.01); *H01Q 1/52* (2013.01); *H01Q 1/38* (2013.01); *H01Q 7/00* (2013.01)
USPC .................. 343/793; 343/700 MS; 340/572.7

(58) Field of Classification Search
CPC .............. H01Q 9/16; H01Q 1/38; H01Q 9/28
USPC .......................... 343/793, 700 MS; 340/572.7
See application file for complete search history.

(56) References Cited

U.S. PATENT DOCUMENTS

| | | | |
|---|---|---|---|
| 6,371,380 B1 | 4/2002 | Tanimura | |
| 6,778,141 B1* | 8/2004 | Yeh | ........ 343/700 MS |
| 7,250,867 B2 | 7/2007 | Sakama et al. | |
| 7,495,181 B2 | 2/2009 | Matsushita et al. | |
| 2005/0093678 A1 | 5/2005 | Forster et al. | |
| 2005/0140512 A1* | 6/2005 | Sakama et al. | ............. 340/572.7 |
| 2006/0267843 A1 | 11/2006 | Sakama et al. | |
| 2007/0046544 A1* | 3/2007 | Murofushi et al. | .... 343/700 MS |
| 2007/0229388 A1* | 10/2007 | Lynch et al. | .................. 343/893 |
| 2008/0084259 A1 | 4/2008 | Yoshida et al. | |
| 2008/0106412 A1 | 5/2008 | Sakama et al. | |
| 2008/0172860 A1 | 7/2008 | Sakama et al. | |
| 2008/0257599 A1* | 10/2008 | Matsushita et al. | ........... 174/390 |

FOREIGN PATENT DOCUMENTS

| | | |
|---|---|---|
| CN | 1926933 | 3/2007 |
| EP | 2 096 711 | 9/2009 |
| JP | 2000-113142 | 4/2000 |
| JP | 2000-236214 | 8/2000 |
| JP | 2002-314284 | 10/2002 |
| JP | 2003-060430 | 2/2003 |
| JP | 3647446 | 5/2005 |
| JP | 2005-159337 | 6/2005 |
| JP | 2005-184012 | 7/2005 |
| JP | 2005-210676 | 8/2005 |

| | | |
|---|---|---|
| JP | 2005-327245 | 11/2005 |
| JP | 2005-354106 | 12/2005 |
| JP | 2006-005365 | 1/2006 |
| JP | 2006-128664 | 5/2006 |
| JP | 2006-333403 | 12/2006 |
| JP | 2007-124638 | 5/2007 |
| JP | 2007-143132 | 6/2007 |
| JP | 2008-117165 | 5/2008 |
| WO | WO 02/07085 | 1/2002 |
| WO | WO 2007/000578 | 1/2007 |
| WO | WO 2007/046527 | 4/2007 |

OTHER PUBLICATIONS

Japanese Office Action dated Jun. 9, 2009.
Japanese Office Action dated Sep. 1, 2009.
Japanese Office Action dated Jun. 1, 2010.
Japanese Office Action dated Dec. 8, 2009.
Corresponding JP 2005-327939, published on Nov. 24, 2005.
International Preliminary Report on Patentability dated Jun. 17, 2010.
Office Action dated Mar. 6, 2012 for corresponding Japanese patent application No. 2008-094405 with English translation.
Office Action dated Mar. 12, 2012 for corresponding Chinese patent application No. 200880011554.4 with English translation.
Extended European search report for corresponding European patent application No. 08740142.8 dated Jun. 11, 2012.
Extended European search report for corresponding European patent application No. 08739559.6 dated Aug. 17, 2012.
Office Action for corresponding Chinese patent application No. 200880113982.8 dated Jul. 3, 2013 with English translation.
Office Action dated Feb. 8, 2013 for corresonding Chinese patent application No. 200880113982.8 with English translation.
Office Action for corresponding Taiwanese patent application No. 097142308 dated May 8, 2013 with English translation.
Office Action for corresponding European patent application No. 08739559.6 dated Apr. 19, 2013.
Office Action for corresponding Chinese patent application No. 200880112937.0 dated Mar. 26, 2013 with English translation.
Notification of Reason for Refusal for corresponding Japanese patent application No. 2012-139952 dated Aug. 27, 2013 with English translation.
Extended European Search Report for corresponding European patent application No. 08845025.9 dated Feb. 5, 2014.

* cited by examiner

*Primary Examiner* — Dameon Levi
*Assistant Examiner* — Collin Dawkins
(74) *Attorney, Agent, or Firm* — Harness, Dickey & Pierce, P.L.C.

(57) ABSTRACT

A wireless communication-improving sheet member for increasing a possible communication distance of an IC tag for wireless communication, a wireless IC tag, an antenna, and a wireless communication system. The sheet member may include a first spacer having an arrangement face on which the wireless IC tag is disposed without a wired connection, and an auxiliary antenna is disposed on the first spacer on an opposite side to the arrangement face, the auxiliary antenna resonating with electromagnetic waves used in the wireless communication. The auxiliary antenna has a first conductor layer as a resonant layer and a second spacer. The second spacer is disposed on an opposite side to the first spacer with the first conductor layer interposed therebetween. A discontinuous area is disposed in the first conductor layer of the auxiliary antenna.

20 Claims, 24 Drawing Sheets

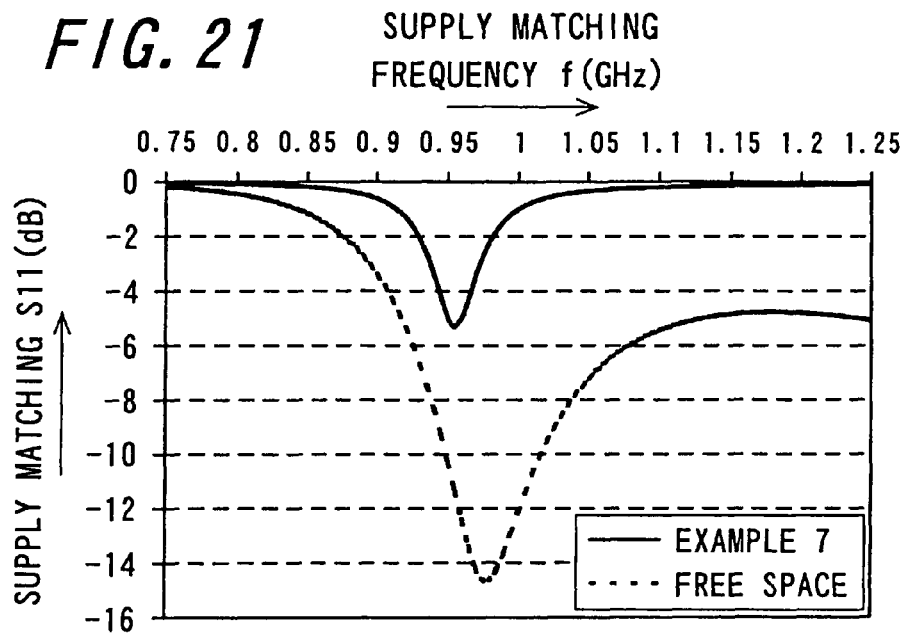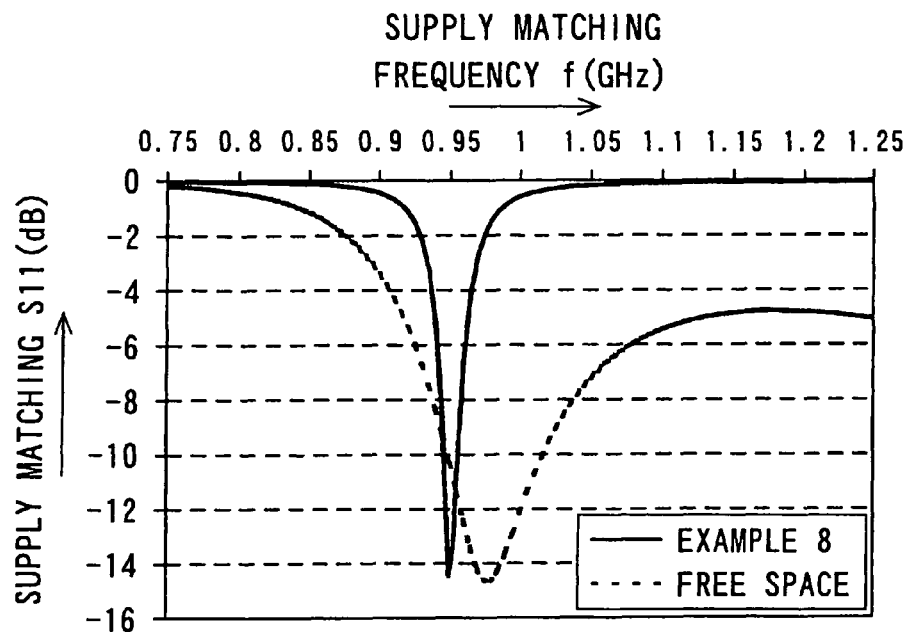
FIG. 21

RADIO WAVE ABSORBER IS DISPOSED ON FLOOR FACE AND WALL FACE

BACKGROUND ART

BACKGROUND ART

US 8,743,006 B2

WIRELESS COMMUNICATION-IMPROVING SHEET MEMBER, WIRELESS IC TAG, ANTENNA, AND WIRELESS COMMUNICATION SYSTEM USING THE SAME

TECHNICAL FIELD

The present invention relates to a wireless communication-improving sheet member that increases the communication distance when used together with a wireless IC tag and an antenna, a wireless IC tag, an antenna, and a wireless communication system.

BACKGROUND ART

Wireless communication techniques are applied not only to the field of information communication but also to the field of logistics management, manufacturing, and the like. An IC tag for wireless communication (hereinafter, simply referred to as an "IC tag" or a "tag") is widely known as a product that plays an important role in RFID (radio frequency identification) technology. Since an IC tag can be used in a wide range of applications for logistics management or low-cost information storage media, the IC tag is used in various environments.

An IC tag is a wireless communication apparatus including a chip that stores data such as an identification number and an antenna that is used for transmitting and receiving radio waves, and is significantly advantageous in that the IC tag can be realized as a small, thin, and light apparatus.

In order to sufficiently make use of such an advantage, it is preferable that there is no limitation on the position to which the IC tag is stuck, and that the IC tag is configured so as to be capable of performing communication regardless of the position or manner in which the IC tag is stuck.

FIG. 30 is a cross-sectional view schematically showing an IC tag 1 according to a conventional technique. An RFID (radio frequency identification) system is a system used for automatically recognizing individual objects, and basically includes a reader and a transponder. The IC tag 1 is used as a transponder of this RFID system.

The communication system in FIG. 30 is an electromagnetic induction type system that transfers energy or signals through the coupling of magnetic fluxes between coil antennas of a tag and a reader. A passive IC tag of the electromagnetic induction type has a maximum communication distance of up to approximately 1 m, and is used for short range communication. The frequency used in this system is, for example, in an LF (low-frequency) band or an HF (high-frequency) band. The IC tag 1 has a coil antenna 2 that is a magnetic field type antenna for detecting magnetic force lines, and an integrated circuit (IC chip) 3 that performs wireless communication using the coil antenna 2. A configuration is adopted in which the IC tag 1 transmits information stored in the IC chip 3 upon receiving a request signal from a reader 5, in other words, the reader can read information held in the IC tag 1. The IC tag 1 is stuck to a merchandise product or the like, and used for managing merchandise products, for example, for preventing merchandise products from being stolen or for keeping track of inventory status.

In a case where a communication-jamming member 4 (an object made of a conductive material in this example) is present near the IC tag 1 (e.g., the IC tag 1 is stuck to a metal merchandise product in use), when the magnetic force lines of the magnetic field formed by electromagnetic wave signals transmitted and received by the IC tag 1 approach the communication-jamming member 4, the magnetic force lines pass through a position near the surface of the communication-jamming member 4 in parallel thereto without entering the communication-jamming member 4, unlike the behavior in the case of an electric field. As a result, an eddy current is generated on the surface of the communication-jamming member 4, and the electromagnetic wave energy is converted into thermal energy and absorbed (resistive loss). When the energy is absorbed in this manner, electromagnetic wave signals are attenuated, and the IC tag 1 cannot perform wireless communication. Furthermore, a phenomenon occurs in which an induced eddy current generates a magnetic field in an opposite direction to the magnetic field for communication of the tag (diamagnetic field), thereby canceling the magnetic field. This phenomenon also makes it impossible for the IC tag 1 to perform wireless communication. Moreover, for example, there is a phenomenon in which the influence of the communication-jamming member 4 shifts the resonant frequency of the IC tag 1. Accordingly, the electromagnetic induction type IC tag 1 cannot be used near the communication-jamming member 4.

As described above, "communication-jamming member" is a collective term for materials that, when present near an antenna, change the resonant frequency of an antenna designed for a free space environment, or reduce the exchange of electromagnetic waves between antennas. In the invention, countermeasures are taken mainly for the case in which the communication-jamming member is made of metal.

FIG. 31 is a simplified cross-sectional view showing an IC tag 1A according to another conventional technique. The IC tag 1A shown in FIG. 31 is similar to the IC tag 1 in FIG. 30, and thus, the corresponding constituent elements are denoted by the same numerals, and only different constituent elements in the configuration will be described. In order to solve the problem of the IC tag 1 in FIG. 30, the IC tag 1A in FIG. 31 is configured to include a magnetic wave absorbing plate 7 disposed between the antenna 2 and the member 4 that is a product to which the IC tag 1A is attached. The magnetic wave absorbing plate 7, which is a sheet having a complex relative magnetic permeability, is made of a highly magnetically permeable material such as sendust, ferrite, or carbonyl iron, that is, a material having a high complex relative magnetic permeability.

The complex relative permeability has a real part and an imaginary part. As the real part increases, the complex relative permeability increases. In other words, a material having a high complex relative permeability has a large real part in that complex relative permeability. In the case where a material having a large real part in the complex relative permeability thereof is present in a magnetic field, the magnetic force lines are collected and passed through the material. In the IC tag 1A using a magnetic field type antenna 2 that detects magnetic force lines in electromagnetic induction-type communication, a magnetic absorbing plate 7 is provided so as to prevent leakage of the magnetic field toward the communication-jamming member 4, and thus, even when the IC tag 1A is used near the communication-jamming member 4, attenuation of the magnetic field energy is suppressed, and wireless communication can be performed. This sort of IC tag 1A is disclosed, for example, in Japanese Unexamined Patent Publication JP-A 2000-113142. Here, the wireless communication is performed based on a modulated magnetic field, and this communication is electromagnetic induction-type communication according to the invention.

In this communication-improving method, the magnetic absorbing member 7 having magnetism is disposed between the first antenna 2 and the communication-jamming member 4, and thus, magnetic force lines used for communication are absorbed by and passed through the magnetic absorbing member 7. The permeability of the magnetic absorbing member 7 is an important factor. This improving method is effective in the case of electromagnetic induction-type communication that performs communication through magnetic coupling, but is not effective in the case of radio-wave-type communication. The reason for this is that, although the travel direction of the magnetic field (magnetic flux loop) can be controlled by a magnetic material even in a near field, high-frequency radio waves used in radio-wave-type communication have a strong tendency to proceed in straight lines, and the travel direction cannot be easily changed without an antenna member or the like.

The communication mechanism of the IC tag varies depending on the frequency of radio waves used. In a case where radio waves having a higher frequency are used, radio-wave-type communication is adopted in which energy and signals are transferred by exchanging electromagnetic waves between an antenna of a tag and an antenna of a reader. For example, in the case where radio waves in a UHF (ultrahigh frequency wave) band, an SHF (centimeter wave) band, or an EHF (millimenter wave) band are used, a tag transmits and receives information according to radio-wave-type communication using an electric-field-type antenna such as a so-called dipole antenna. Unlike the case of the electromagnetic induction-type communication using the coupling of magnetic fluxes, radio-wave-type communication realizes long range communication by radiating electromagnetic waves into the air. The wireless communication-improving sheet member, the wireless IC tag, the antenna, and the wireless communication system using the same of the invention are applied to this wireless radio-wave-type communication. The electromagnetic induction type and the radio wave type are different from each other in the relationship between the wavelength of electromagnetic waves and the distance between antennas. In the case where the distance is short for the wavelength, an electromagnetic induction type is used in which a change in the electric field/magnetic field is transmitted to the other antenna before being radiated into the air. In the case where the distance is long for the wavelength, a radio wave type is used in which information is transmitted as electromagnetic waves through the air. Furthermore, antennas used in the electromagnetic induction type are magnetic-field-type antennas such as a coil antenna, and those used in the radio wave type are electric-field-type antennas such as a dipole antenna or a patch antenna. That is to say, the communication system itself is different therebetween.

Also in the case where a conductive material (a communication-jamming member), such as metal, is present near an IC tag that performs radio-wave-type communication, communication becomes impossible through a mechanism different from that of the electromagnetic induction type. When reception by the IC tag causes a resonant current to flow through an antenna, a current in the opposite direction is induced on the side of a nearby metal face, and the induced current significantly lowers the impedance of the transferred signals. Accordingly, the impedance does not match the input impedance of an IC chip designed for communication in free space, and the possible communication distance is shortened.

Typically, an electric-field-type antenna such as a dipole antenna, a monopole antenna, and a loop antenna is designed as follows: When the antenna receives radio waves having a specific frequency, a resonant current is formed at the antenna, and when this current flows through an IC chip, the impedance matches the input impedance of the chip.

FIG. 32 is a cross-sectional view showing a momentary electric field (the direction of a current) formed near a tag main body 22 (IC tag) in a state where the tag main body 22 (IC tag) is disposed near a conductive member, which is a communication-jamming member.

In the case where a communication-jamming member 212 is present near an antenna element 211, a resonant current I11 is formed that is directed to one end portion (hereinafter, referred to as a "first end portion") 211*a* from the other end portion (hereinafter, referred to as a "second end portion") 211*b* of the antenna element 211, and a current I12 is formed that is directed from one portion (hereinafter, referred to as a "first portion") 212*a* to the other portion (hereinafter, referred to as a "second portion") 212*b* on the communication-jamming member 212, and thus, currents in the opposite directions flow at the antenna element 211 and the communication-jamming member 212. That is to say, an antenna having the same scale and that performs the opposite operation is formed on the communication-jamming member 212.

The voltage that is applied to an IC 217 or that is applied from the IC 217 started by the transmission of energy is an alternating voltage, and thus, a state in which a current in the direction shown in FIG. 32 is formed and a state in which a current in the opposite direction is formed alternately occur. When the frequency increases, this state is equivalent to a state in which a current I0 is formed between the first end portion 211*a* of the antenna element 211 and the first portion 212*a* of the communication-jamming member 212, and between the second end portion 211*b* of the antenna element 211 and the second portion 212*b* of the communication-jamming member 212, that is, a short circuit occurs, at a high frequency, between the first end portion 211*a* of the antenna element 211 and the first portion 212*a* of the communication-jamming member 212, and between the second end portion 211*b* of the antenna element 211 and the second portion 212*b* of the communication-jamming member 212. When such a short circuit occurs at a high frequency, a closed circuit is formed by the antenna element 211 and the communication-jamming member 212, and the current value increases compared with the case in which the communication-jamming member 212 is not present nearby. That is to say, compared with the case in which the communication-jamming member 212 is not present near the antenna element 211, the impedance is significantly lowered. As a result, the impedance does not match the input impedance of the chip, and information signals are not transferred. Accordingly, the possible communication distance is shortened.

Furthermore, not only metal but also paper, glass, resin, liquid, magnetic materials, other antennas, or the like may cause the communication properties of the IC tag to deteriorate when the material is present nearby.

In the case of these materials, the permittivity or the permeability of the materials changes the resonant frequency of the antenna, the resonant frequency of the antenna becomes different from the frequency of radio waves used by a component with which communication is performed, and the possible communication distance is shortened.

FIG. 33 is a cross-sectional view schematically showing an IC tag 1B according to still another conventional technique. The IC tag 1B shown in FIG. 33 is similar to the IC tag 1 in FIG. 30, and thus, corresponding constituent elements are denoted by the same reference numerals, and only different constituent elements will be described. In the IC tag 1B in FIG. 33, a first antenna 2 that is a dipole antenna and an IC 3 are arranged on a substrate 8, and a second antenna 1C is disposed via a first spacer 9 on a communication direction side of the first antenna 2. Furthermore, in the IC tag 1B, a second spacer 11 is disposed on the substrate 8 on the opposite side to the first antenna 2. The IC tag 1B is used near the communication-jamming member 4 in a state where the substrate 8 and the second spacer 11 are interposed between the first antenna 2 and the communication-jamming member 4. The IC tag 1B has a configuration in which the second antenna 1C that is an auxiliary antenna is disposed on the communication direction side of the first antenna 2, to which an IC is connected, and thus, the intensity of radio waves of the first antenna 2 is prevented from being attenuated by the communication-jamming member 4. This sort of IC tag 1B is disclosed, for example, in Japanese Unexamined Patent Publication JP-A 2005-210676.

The IC tag 1B in FIG. 33 is a specially designed tag having an integrated structure in which the first antenna 2 is held between the second antenna 1C, and the first and the second spacers 9 and 11. With this structure, the versatility to improve communication performance by simply tackinessly or adhesively applying a commercially available wireless IC tag is not provided. Furthermore, even after such countermeasures are taken, the first antenna 2 and the IC 3 are positioned near the communication-jamming member 4, and the influence of the type of the communication-jamming member 4, for example, a difference in permittivity, shifts the resonant frequency.

DISCLOSURE OF INVENTION

It is an object of the invention to provide a wireless communication-improving sheet member capable of increasing the possible communication distance of an IC tag for wireless communication, a wireless IC tag, an antenna, and a wireless communication system.

It is another object of the invention to provide a sheet member having a versatility to improve wireless communication properties by simply tackinessly or adhesively applying a wireless IC tag.

The invention provides a wireless communication-improving sheet member that is used between a wireless IC tag and a communication-jamming member at the time of wireless communication with electric waves of a UHF band, an SHF band and an EHF band using an antenna for performing radio-wave-type communication near the communication-jamming member, and that improves wireless communication properties of the wireless IC tag when the wireless IC tag is disposed on an arrangement face without a wired connection of an IC chip provided in the wireless IC tag and an auxiliary antenna, comprising:

a first spacer having the arrangement face, the first spacer being made of a non-conductive material;

an auxiliary antenna disposed on the first spacer on an opposite side to the arrangement face, the auxiliary antenna having a first conductor layer including a portion resonating with electromagnetic waves used in the wireless communication; and a second spacer disposed on the auxiliary antenna on an opposite side to the first spacer with the first conductor layer interposed therebetween, the first spacer, the auxiliary antanna and the second spacer being stacked one on top of another;

a groove, an opening or a cutout being disposed in the first conductor layer of the auxiliary antenna.

Furthermore, in the invention, it is preferable that the first conductor layer of the auxiliary antenna includes a plurality of conductor elements that resonate with the elecromagnetic waves used in the wireless communication, the conductor elements are insulated from each other.

Furthermore, in the invention, it is preferable that the first conductor layer of the auxiliary antenna includes a plurality of divided conductor portions arranged in a planar direction or a stacked direction, the conductor portions are insulated from each other, and at least one of the first conductor layer and the conductor portions resonates with electromagnetic waves used in the wireless communication.

Furthermore, in the invention, it is preferable that the second spacer is made of a low loss material layer that is non-conductive, and collects and passes electromagnetic waves therethrough, which is one selected from among rubber, a thermoplastic elastomer, various types of plastic, wood, and paper, and a porous material thereof.

Furthermore, in the invention, it is preferable that the wireless communication-improving sheet member further comprises a second conductor layer on the auxiliary antenna on an opposite side to the second spacer.

Furthermore, in the invention, it is preferable that the wireless communication-improving sheet member further comprises a second conductor layer on the auxiliary antenna on an opposite side to the second spacer, and the second conductor layer is larger than the first conductor layer included in the auxiliary antenna.

Furthermore, in the invention, it is preferable that at least one of the groove, the opening or the cutout is disposed so as to face at least an IC chip or reactance loading portion provided in the wireless IC tag when the wireless IC tag is disposed thereon.

Furthermore, in the invention, it is preferable that at least one of the groove, the opening or the cutout is disposed so as to resonate with electromagnetic waves used in the wireless communication.

Furthermore, in the invention, it is preferable that at least part of an outline shape of the first conductor layer or the groove, the opening or the cutout is curved.

Furthermore, in the invention, it is preferable that part or whole of an outer surface of the wireless communication-improving sheet member is coated with a dielectric material.

Furthermore, in the invention, it is preferable that at least one of the first spacer and the coating dielectric material is made of a low loss material layer that is non-conductive, and collects and passes electromagnetic waves therethrough.

Furthermore, in the invention, it is preferable that at least one of the first spacer and the second spacer is made of foam.

Furthermore, in the invention, it is preferable that the wireless communication-improving sheet member can be attached to an attachment target article using tackiness or adhesiveness of at least one face of the wireless communication-improving sheet member, or using fixing means.

Moreover, the invention provides a wireless IC tag, disposed without a wired connection on the arrangement face of the wireless communication-improving sheet member mentioned above, or comprising an IC chip embedded in the wireless communication-improving sheet member or the auxiliary antenna.

Moreover, the invention provides a radio-wave-type antenna using the wireless communication-improving sheet member mentioned above.

Moreover, the invention provides a wireless communication system using at least the wireless IC tag or the antenna mentioned above.

BRIEF DESCRIPTION OF DRAWINGS

Other and further objects, features, and advantages of the invention will be more explicit from the following detailed description taken with reference to the drawings wherein:

FIG. 21 are graphs showing the reflection property value S11 as results of the evaluation of the tag 21 using the tag main body 22 shown in FIG. 17 and having the resonant layer 27 shown in FIG. 15;

BEST MODE FOR CARRYING OUT THE INVENTION

Figure 1:
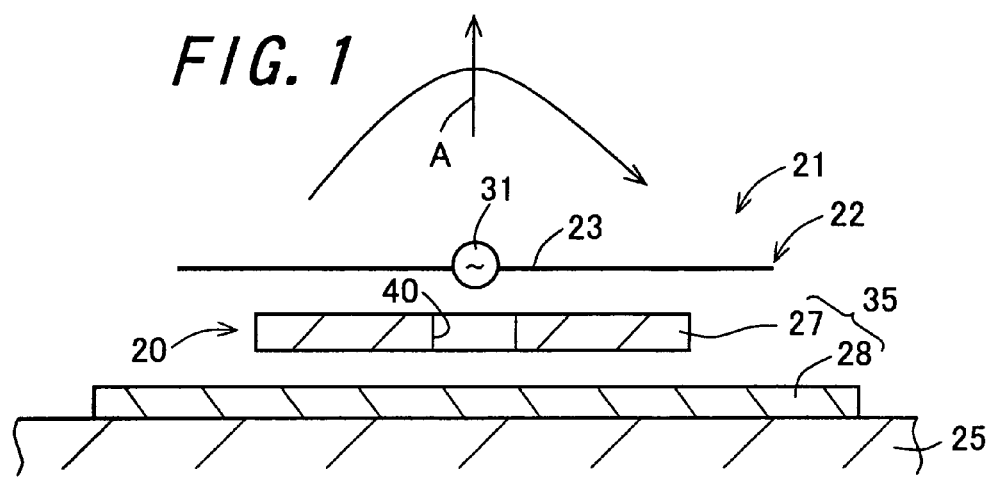
FIG. 1 is a cross-sectional view schematically showing a tag 21 including a sheet member 20 according to an embodiment of the invention.

The invention is directed to a wireless communication-improving sheet member (hereinafter, simply referred to as a "sheet member") that improves the wireless communication properties of a wireless IC tag when the wireless IC tag is disposed thereon without a wired connection.

The sheet member of the invention includes a first spacer that has an arrangement face on which a wireless IC tag is disposed without a wired connection; an auxiliary antenna that is disposed on the first spacer on the opposite side to the arrangement face, and that has a first conductor layer; and a second spacer that is disposed on the auxiliary antenna on the opposite side to the first spacer, the first spacer, the auxiliary antenna and the second spacer being stacked one on top of another, and a discontinuous area is disposed in the first conductor layer of the auxiliary antenna. The discontinuous area is formed as a slot, a slit, a groove, an opening, or the like.

The following is the background to the invention of the thus configured sheet member by the inventors.

A radio wave type wireless communication apparatus using a dipole antenna, a monopole antenna, a loop antenna, or the like used in a wireless IC tag as proposed in conventional techniques is assumed to be used in free space, and thus, in the case where a member that jams communication (a conductive member such as metal, a dielectric member such as paper, glass, or liquid, a magnetic member, an antenna, an electronic device, an electronic substrate, or the like) is present near the antenna, the influence of the communication-jamming member makes it difficult to perform wireless communication, and the possible communication distance is shortened.

Conversely, for example, in the case where a wireless IC tag including a patch antenna is used, the configuration includes a resonant plate that resonates with a communication frequency, and a conductor plate (ground plate) at a ground potential. The ground plate can reduce the influence of the communication-jamming member, and the possible communication distance is sufficiently maintained.

However, this type of tag is obtained by attaching an IC chip to a patch antenna, and is a known art in which the communication distance can be naturally secured when the impedance can be adjusted. The tag to which the patch antenna is attached has a ground plate, and thus, the tag can be used either in free space or near a communication-jamming member. However, this tag is more expensive than a wireless tag including a general purpose dipole antenna, and thus, this configuration is not usually applied to a tag except for an antenna on the side of the reader.

The inventors developed a comparatively low-cost sheet member and auxiliary antenna that can improve communication near a communication-jamming member when the sheet member and the auxiliary antenna are simply stacked on a general purpose tag without a wired connection thereto. Accordingly, a widely used general purpose wireless IC can be used also with a communication-jamming member, which was not possible so far, and the application range can be significantly expanded.

First, an attempt was made to improve communication using a wireless IC tag by combining a radio-wave-type wireless IC tag having a dipole antenna, a monopole antenna, and a loop antenna, with an auxiliary antenna including a patch antenna.

Then, a sheet member was produced in which a first spacer and an auxiliary antenna including a patch antenna among the constituent elements of the above-described configuration were stacked, and a wireless IC tag was simply disposed without a wired connection thereto. When the possible communication distance of the wireless IC tag was measured, no improvement was confirmed, and the communication distance was found to be shortened. The reason for this was considered to be that electromagnetic coupling was not formed between the dipole antenna, the monopole antenna, and the loop antenna, and the like of the wireless IC tag and the auxiliary antenna, and the functionality of the auxiliary antenna was not sufficiently realized. More specifically, electromagnetic coupling between the dipole antenna, the monopole antenna, the loop antenna and the like and the auxiliary antenna was formed only through a path around the external periphery of the resonant plate of the patch antenna, coupling was not actually substantially formed, and thus, the function of the auxiliary antenna was not exerted. Moreover, the IC chip and a reactance loading portion (a loop portion of the tag antenna) were affected by the auxiliary antenna, and thus, the possible communication distance was shortened. That is to say, the first conductor layer (resonant plate) of the auxiliary antenna was positioned near the IC chip and the reactance loading portion, an induced current was formed on the surface of the conductor layer, and thus, the impedance was lowered (see Comparative Example 1). This sort of influence of a nearby communication-jamming member on a reactance loading portion had not been pointed out.

Based on this knowledge, further improvements were made, and it was found that, when a discontinuous area is formed in a first conductor layer of an auxiliary antenna, communication using a wireless IC tag can be improved.

The wireless IC tag and the auxiliary antenna were intensively coupled via the discontinuous area, and thus, wireless communication using an auxiliary antenna was improved. As a result, the possible communication distance of the IC tag was increased.

Moreover, when a discontinuous area was formed on the first conductor layer of the auxiliary antenna at the position opposing the IC chip and the loop portion (the reactance loading portion), the influence of the first conductor layer was reduced, and the possible communication distance was increased. That is to say, when a discontinuous area is formed in the auxiliary antenna, the electrical resistance in the area through which an induced current of the first conductor layer passes can be significantly improved, and thus, formation of an induced current on the surface of the conductor layer, which leads to a decrease in the impedance, can be suppressed.

At that time, when a discontinuous area is formed in the auxiliary antenna, an electric field is formed in parallel to the long axis direction of the antenna (the IC tag) so as to cross the discontinuous area according to the resonance of the antenna (the IC tag), and an electric field is formed also therefrom to a second conductor layer or a communication-jamming member. With these electric fields, the electromagnetic coupling between the antenna (the IC tag) and the chip, and the auxiliary antenna is activated.

The auxiliary antenna of the invention is different from a patch antenna not only in that, in terms of structure, a discontinuous area is formed in the resonant layer, but also in that the discontinuous area is used as an opening through which electromagnetic energy moves in and out. That is to say, in a patch antenna, which is an electric-field-type antenna, the opening through which electromagnetic energy moves in and out and a transfer path are also present inside the patch antenna in an overlapped manner near the center of the patch in which the electric field is originally 0, and thus, an operation mechanism is obtained that exchanges electromagnetic energy nearby as well as performing conventional antenna operations.

More specifically, a patch antenna includes two conductor plates consisting of a resonant layer and a reflecting layer. The electric field between the two conductors is intensive and at a maximum at both end portions (edge portions, only in two directions or may be in all four directions in the case of a patch antenna) having charge of radiating and entering portions of radio waves, and electric fields radiated therefrom are synthesized above the patch antenna and directly radiated into space. Electric fields are received through the opposite operation.

In the thus configured patch antenna, which is an electric-field-type antenna, the electric field is at a maximum at both end portions, but the electric field is at a minimum (almost 0) near the center portion. Regarding the behavior of an electromagnetic field, the magnetic field is at a minimum at a position where the electric field is at a maximum, and the magnetic field is at a maximum at a position where the electric field is at a minimum. Although this relationship was known, such an area of a patch antenna having an intensive magnetic field has not been used for another purpose.

In the invention, this magnetic field component is used for electromagnetic coupling with a wireless IC tag in a near field. Furthermore, it was found that, when the discontinuous area is formed as a slot antenna or the like, the magnetic field antenna effect can be combined for electromagnetic coupling, and the auxiliary antenna and the wireless IC tag can be intensively and stably linked without a wired connection. The discontinuous area of the invention is also characterized in that an electromagnetic coupling effect and an impedance-adjusting effect can be simultaneously obtained.

The auxiliary antenna of the invention generally resonates with a wireless communication frequency when combined with a wireless IC tag. When the wavelength of radio waves of the wireless communication frequency is taken as λ, the resonant layer of the auxiliary antenna has a resonance size in which one side is around λ/2 and at least in the range of λ/8 to 3λ/4.

This auxiliary antenna is different from a configuration in which, for example, a plurality of (two or four) patch antennas having a resonance of λ/2 are arranged in the horizontal direction, and electric fields are used that are radiated from the end portions of adjacent patch antennas (that is, an area having an intensive electric field) and synthesized at space between the closely arranged patch antennas. When a plurality of patch antennas are arranged in the horizontal direction in this manner, electric fields are synthesized, and an effect increasing the directionality of radiated radio waves is obtained. However, since a plurality of patch antennas having a resonance of λ/2 are arranged in the horizontal direction, there is a problem in which the size increases. Here, electric fields are received through the opposite operation of the radiating operation as described above.

The invention is different from the above-described configuration in that a discontinuous area is formed in an antenna including one patch antenna (one resonant layer) and this antenna is operated as an auxiliary antenna. That is to say, based on the discovery of the coupling effect of electromagnetic energy via a discontinuous area using magnetic fields and the effect of the auxiliary antenna including one patch antenna, the resonant layer is made smaller, and wireless communication is improved.

The invention is characterized in that communication using a wireless IC tag can be improved when the wireless IC tag is simply disposed without a wired connection. In the case of a commercially available wireless IC tag, a chip input impedance value varies depending on the IC chip used. The input impedance varies depending on whether or not the wireless IC tag is in operation, and varies depending on the amount of energy received with regard to operational conditions. Typically, in the case of a tag, an IC chip and an antenna element are electrically connected via wiring, and adjustment of the impedance is confirmed based on antenna performance before being provided as a product. The instability of this wired connection is an important factor directly leading to the instability of such tag products.

The wireless communication-improving sheet member of the invention is characterized in that impedance matching can be performed and matching can be improved by simply disposing an IC chip or a reactance loading portion while controlling the position thereof so that the IC chip or the reactance loading portion faces a discontinuous area, without a wired connection to a wireless IC tag having an impedance that is unstable and tends to change as described above. Based on examination of the configuration or the arrangement position, it was found that the function of adjusting the input impedance can be realized even without a wired connection to a wireless IC tag, and thus, the invention was achieved. This simple input impedance-adjusting method can realize a wireless communication-improving effect.

Furthermore, the auxiliary antenna may have two conductor layers. In this case, a second conductor layer has an effect of suppressing the influence of the type of an article to which the wireless IC tag is attached. Thus, even in the case where metal, paper, glass, resin, liquid, an electronic noise source, such as an electronic device, an antenna, an electronic substrate, or the like is present near the wireless IC tag, good stable wireless communication properties can be obtained when the wireless communication-improving sheet member of the invention is used.

Now referring to the drawings, preferred embodiments of the invention are described below.

Figure 2:
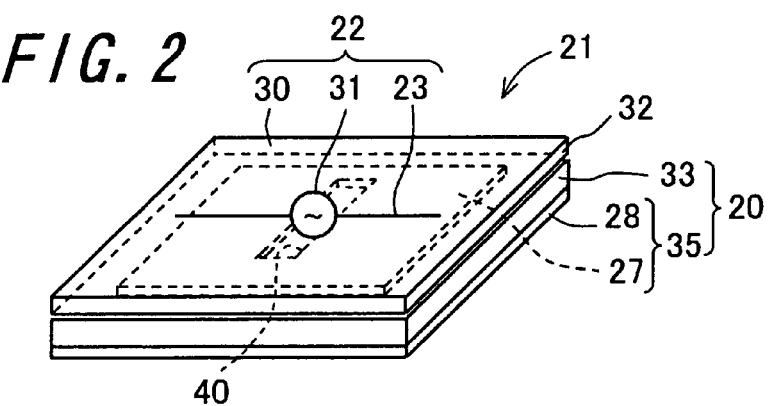
FIG. 2 is a perspective view showing the tag 21.
Figure 3:
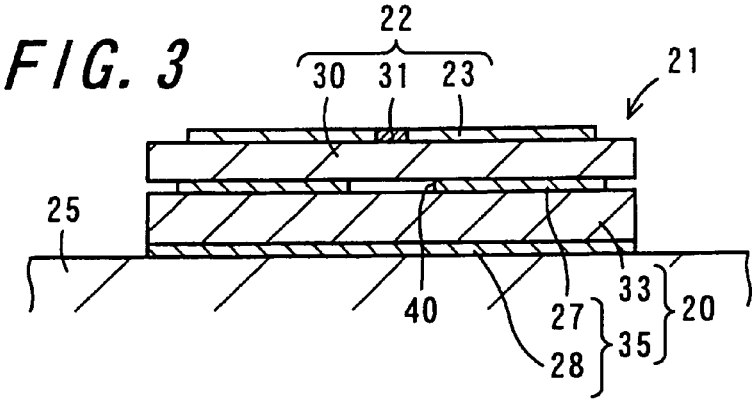
FIG. 3 is a cross-sectional view showing the tag 21.

FIG. 1 is a cross-sectional view schematically showing a tag 21 including a sheet member 20 according to an embodiment of the invention. FIG. 2 is a perspective view showing the tag 21. FIG. 3 is a cross-sectional view showing the tag 21.

The tag 21 is a transponder in the RFID system, and performs wireless communication with a reader. The tag 21 is attached to, for example, articles, and used for managing those articles, but also may be used in other applications. The tag 21, which is a communication apparatus, is obtained by stacking the tag main body 22, which is a communication-forming member, and the sheet member 20 or an auxiliary antenna 35. The tag 21 includes an antenna apparatus that is provided with an antenna element 23 of the tag main body 22 and the sheet member 20 or the auxiliary antenna 35. The tag main body 22 is a general purpose IC tag product that includes a substrate 30, the antenna element 23, and an IC 31. The antenna element 23 and the IC 31 are essential constituent elements of the tag main body 22. The tag main body 22 may be coated, or, for example, a dielectric such as substrate, coating material, or tacky material may be held between the tag main body 22 and the sheet member 20 or the auxiliary antenna 35. The sheet member 20 is a sheet member for preferably performing wireless communication using the tag main body 22 and the like near a communication-jamming member 25. The sheet member 20 includes the auxiliary antenna 35, and is disposed between the antenna element 23 or the tag main body 22 and the communication-jamming member 25. The auxiliary antenna 35 in FIG. 1 includes a second conductor layer 28. Hereinafter, the frequency of electromagnetic waves used in wireless communication using the antenna element 23, the tag main body 22, or the tag 21 is referred to as the communication frequency.

A communication-jamming member of the invention refers to an object that may deteriorate the communication properties of the antenna element 23 or the tag main body 22 when the object is present near the antenna element 23 or the tag main body 22, compared with those in the case of free space. Examples of such a communication-jamming member include objects that have a portion made of a conductive material, such as metal, a charge-preventing material, a dielectric material, such as glass, paper, or liquid, a magnetic material, and an electronic noise source, such as an electronic device, an antenna, a tag, an IC card, an electronic substrate, or the like.

When a conductive material, such as metal, is present near the antenna element 23 or the tag main body 22, the impedance of the antenna element 23 or the tag main body 22 is significantly lowered, and wireless communication becomes difficult. Furthermore, a dielectric material, such as cardboard, resin, glass, or liquid, changes the resonant frequency of the antenna element 23 or the tag main body 22 due to the permittivity of the dielectric material, and jams wireless communication. Moreover, a magnetic material also changes the resonant frequency of the antenna element 23 or the tag main body 22 due to the permeability of the magnetic material, and jams wireless communication. An electronic noise source lowers the SN ratio of the antenna sensitivity due to the influence of noise. All of these objects that jam wireless communication using the antenna element 23 or the tag main body 22 are referred to as communication-jamming members.

FIG. 1 shows the case in which an article 25 to which the tag 21 is attached is a communication-jamming member. The tag 21 is attached to the article 25 in use so that the sheet member 20 or the auxiliary antenna 35 is interposed between the antenna element 23 or the tag main body 22 and the article 25, which is a communication-jamming member. Accordingly, the sheet member 20 or the auxiliary antenna 35 is disposed between the tag main body 22 and the article 25. The antenna element 23 or the tag main body 22 and the sheet member 20 or the auxiliary antenna 35 are electrically insulated from each other. In order to control spacing, as shown in FIG. 2, a first spacer layer 32 which is non-conductive is disposed between the antenna element 23 or the tag main body 22 and the auxiliary antenna 35. The sheet member 20 or the auxiliary antenna 35 is disposed on a side facing the opposite direction to a communication direction A with respect to the antenna element 23 or the tag main body 22.

The sheet member 20 or the auxiliary antenna 35 includes two conductor layers 27 and 28 each made of a conductive material. The conductor layers 27 and 28 are electrically insulated from the antenna element 23 or the tag main body 22, and electrically insulated from each other. At least one of the two conductor layers (the first conductor layer 27 disposed closer to the antenna element 23 or the tag main body 22, in this embodiment) is a resonant layer that resonates with electromagnetic waves used in wireless communication using the antenna element 23 or the tag main body 22. The first conductor layer 27 functioning as a resonant layer includes a discontinuous area 40. The discontinuous area 40 in FIG. 1 is in the shape of a groove (slot), and this configuration is referred to as Embodiment A. The function of the discontinuous area 40 will be described later. Hereinafter, the first conductor layer 27 disposed closer to the antenna element 23 or the tag main body 22 is referred to as a resonant layer 27. The second conductor layer 28, which is the other conductor layer, functions as a reflecting layer, and is referred to as a reflecting layer 28. The reflecting layer 28 and the communication-jamming member 25 do not necessarily have to be electrically insulated from each other.

A discontinuous area may be disposed not only in the resonant layer 27 but also in the first spacer layer 32 or a second spacer layer 33. Such a spacer layer may be space, and is made of a material that suppresses the loss of electromagnetic waves. Thus, such a discontinuous area may be formed, and any other treatment may be performed as long as the loss of electromagnetic energy can be kept low.

The reflecting layer 28 may have a shape and a size that are the same as or smaller than those of the resonant layer 27, but, in this embodiment, the reflecting layer 28 has a shape and a size that are the same as or larger than those of the resonant layer 27. When the resonant layer 27 is projected on the surface of the reflecting layer 28, the area of the resonant layer 27 is contained inside the surface of the reflecting layer 28. When the reflecting layer 28 is larger than the resonant layer 27, the influence of the type of the article 25 is reduced, the directionality of radio waves in the communication direction A is increased, and the communication distance can be increased. Furthermore, a discontinuous area may be disposed also in the reflecting layer 28.

The planar shape of the sheet member 20 or the auxiliary antenna 35 when viewed in the stacked direction is, in many cases, rectangular, although depending on the shape of the wireless IC tag arranged. Furthermore, the total thickness of the sheet member 20 or the auxiliary antenna 35 is approximately 0.1 to 20 mm.

The antenna element 23 is formed on one or both surfaces of the tag main body 22 of the tag 21 in a thickness direction of the substrate 30, and the IC 31 functioning as an information storage portion is mounted thereon. The substrate 30 (not shown) is made of, for example, a dielectric that is a synthetic resin, and has electrical insulating properties. The material of the substrate 30 may be, for example, any insulating material, such as a resin (e.g., polyethylene terephthalate (PET) or epoxy resin) or paper. The antenna element 23 is realized by a conductor pattern formed on the surface of the substrate 30. The antenna element 23 is made of a conductive material such as metal. The material of the antenna element 23 may be a material having a high electrical conductivity, such as gold, platinum, silver, nickel, chromium, aluminum, copper, zinc, lead, tungsten, iron, or another metal, an alloy material, a metal oxide, or a carbon-based material (e.g., carbon). The antenna element 23 is formed by subjecting the substrate 30 to, for example, wiring, evaporation, etching, or coating such as screen printing. The IC 31 is electrically connected to the antenna element 23, and performs communication via the antenna element 23.

The sheet member 20 or the auxiliary antenna 35 is stacked on the substrate 30 of the tag main body 22. There is no limitation on the direction of the antenna element 23 and the IC 31 with respect to the substrate 30. The sheet member 20 or the auxiliary antenna 35 is a layered product in which the resonant layer 27 and the reflecting layer 28 are stacked with the second spacer layer 33 interposed therebetween. The sheet member 20 has a configuration in which the first spacer layer 32, the resonant layer 27, the second spacer layer 33, and the reflecting layer 28 are stacked in this order from the side of the tag main body 22. The first spacer layer 32 and the second spacer layer 33 are non-conductive. The substrate 30 that functions also as the first spacer layer 32 is interposed between the tag main body 22 and the resonant layer 27, and the second spacer layer 33 is interposed between the resonant layer 27 and the reflecting layer 28. The first spacer layer 32 which is non-conductive is typically disposed between the antenna element 23 or the tag main body 22 and the resonant layer 27. The first spacer layer 32 or the second spacer layer 33 also may be an adhesive layer or a tacky layer as long as the layer is non-conductive. Furthermore, the first spacer layer 32 and the second spacer layer 33 may be a single layer or may be multiple layers, and may be made of different materials. Furthermore, the layers do not necessarily have to be made of a material having a low loss component. Accordingly, the resonant layer 27 and the reflecting layer 28 are electrically insulated from the antenna element 23 or the tag main body 22, and electrically insulated from each other.

In the sheet member 20 or the auxiliary antenna 35, the resonant layer 27 is formed on one surface of the second spacer layer 33 on one side in the thickness direction, and the reflecting layer 28 is formed on the other surface of the second spacer layer 33 on the other side in the thickness direction. The sheet member 20 has a configuration in which the first spacer layer 32 is integrated with the auxiliary antenna 35. The resonant layer 27 and the reflecting layer 28 are layers made of a conductive material, and may be formed, for example, using a similar method and a similar material as in the antenna element 23. The antenna element 23, the resonant layer 27, and the reflecting layer 28 may be made of the same material, or may be made of different materials. Furthermore, the antenna element 23, the resonant layer 27, and the reflecting layer 28 may be formed by the same method, or may be formed by different methods.

The dielectric materials of the first spacer layer 32, the second spacer layer 33, or the coating material need only be at least non-conductive, and there is no limitation on the material thereof. For example, the material may be a material having magnetism, such as rubber ferrite, and a magnetic material (metal oxide, ceramic, granular thin film, ferrite plated material, or the like) without any treatment can be shaped into a layer and used as the spacer layer. Furthermore, the first spacer layer 32 or the second spacer layer 33 may be a dielectric material. For example, the material may be a resin foam as in this embodiment, or may be another foam. Any material can be selected as long as the material can be shaped into a sheet during processing by the application of heat, pressure, ultraviolet rays, a curing agent, or the like. In addition to the above, any organic substance or any inorganic substance, such as canvas, fabric, woven fabric, nonwoven fabric, ceramic, paper, clay, cement, clay-based materials, or the like, may be used. The material also may be a tacky material or an adhesive.

As described above, as the material forming the IC tag 21, the sheet member 20, or the auxiliary antenna 35, such as the dielectric materials of the first spacer layer 32, the second spacer layer 33, or the coating material, a low loss material with low energy loss is selected except for portions that are made of a conductive material, such as metal. In the case where a material with high energy loss has to be partially used, the amount of material used is kept as low as possible so that the energy loss is kept low as a whole.

That is to say, it is preferable to have a high permittivity in order to make the size smaller with the wavelength-shortening effect or to draw an electric field, but it is more important to select a low loss material. More specifically, the real part $\in'$ of the relative permittivity and/or the real part $\mu'$ of the relative permeability in the communication frequency range is to be larger than the relative permittivity 1 and/or the relative permeability 1 in vacuum as much as possible, and the imaginary part $\in''$ of the relative permittivity and/or the imaginary part $\mu''$ of the relative permeability in the same frequency range is to be as small as possible. In the invention, this sort of material is regarded as a material that collects and passes electromagnetic waves therethrough. Since the dielectric tangent tan $\delta$ ($\in''/\in'$) or the magnetic tangent tan $\delta$ ($\mu''/\mu'$) in the communication frequency band is low, loss of electromagnetic energy is low.

Specific examples of the material include space, but an organic material as listed below is typically used. Examples of the organic material include rubber, a thermoplastic elastomer, various types of plastic, wood, and paper, and a porous material thereof. Examples of the rubber include not only natural rubbers but also single synthetic rubbers, such as isoprene rubber, butadiene rubber, styrene-butadiene rubber, ethylene-propylene rubber, ethylene-propylene rubber, ethylene-propylene-diene rubber (EPDM rubber), ethylene-vinyl acetate-based rubber, butyl rubber, butyl halide rubber, chloroprene rubber, nitryl rubber, acrylic rubber, ethylene acrylic rubber, epichlorohydrin rubber, fluorine rubber, urethane rubber, silicon rubber, chlorinated polyethylene rubber, hydrogenated nitryl rubber (HNBR), or liquid rubber, derivatives thereof, and rubbers obtained by modifying these rubbers through various types of modification treatment. These rubbers can be used alone, or in a combination of a plurality of types.

Examples of the thermoplastic elastomer include various thermoplastic elastomers, such as chlorine-based elastomers (e.g., chlorinated polyethylene), ethylene copolymer-based elastomers, acrylic elastomers, ethylene acrylic copolymer-based elastomers, urethane-based elastomers, ester-based elastomers, silicone-based elastomers, styrene-based elastomers, amide-based elastomers, or olefin-based elastomers, and derivatives thereof. Preferably, the thermoplastic elastomer is hydrogenated SBS (SEBS), a polyester elastomer, or the like.

Moreover, examples of the various types of plastic include all types of thermoplastic resins and all types of thermosetting resins, such as polyethylene, polypropylene, AS resin, ABS resin, polystyrene, chlorine-based resin, such as polyvinyl chloride, or polyvinylidene chloride, polyvinyl acetate, ethylene-vinyl acetate copolymer, fluorine resin, silicone resin, acrylic resin, nylon, polycarbonate, polyethylene terephthalate, polyethylene naphthalate, PPE resin, alkyd resin, unsaturated polyester, polysulfone, urethane-based resin, phenol resin, urea resin, and epoxy resin, and derivatives thereof.

The above-described materials may be used without any treatment, or may be composed, modified, or combined in use. The materials are preferably foamed. Examples of typical low density dielectric materials include resin foam such as polystyrene resin foam.

The density of the dielectric material forming the first spacer layer 32 and the second spacer layer 33 is preferably, for example, less than 1.0 g/cm$^3$.

As this sort of low density dielectric material, one or a plurality of materials selected from porous organic materials and porous inorganic materials are used. An unfoamed material may be used, or an unfoamed material and a foamed material may be combined. In addition to the above, paper such as cardboard, wood, glass, plaster, clay-based materials, fabrics, woven fabrics, nonwoven fabrics, composite materials, and the like also can be used.

There is no limitation on means as to the foaming method, but foaming methods are classified into methods in which a foaming agent is added, methods in which thermally expanding fine particles are added, and the like. As the foaming agent, there are organic-based foaming agents and inorganic-based foaming agents. The foaming methods may be a method, for example, in which a foam material such as glass beads is added, water or gas is added, or a supercritical fluid such as supercritical carbon dioxide or supercritical nitrogen is used.

Examples of the organic-based foaming agent added include, but are not limited to, dinitroso pentamethylene tetramine (DPT), azodicarbonamide (ADCA), p,p'-oxybis(benzenesulfonyl hydrazide) (OBSH), and hydrazodicarbonamide (HDCA).

Examples of the inorganic-based foaming agent added include, but are not limited to, sodium hydrogencarbonate, and the agent may be selected and added as appropriate according to the material.

Furthermore, examples of the thermally expanding fine particles added include thermally expanding fine particle pellets in the form of a microcapsule.

There is no particular limitation on the foaming ratio, but the foaming ratio has to be determined so that the change in the thickness of an absorber is small, the strength can be maintained, and the weight can be reduced. Thus, the foaming ratio is preferably approximately 1 to 50 times.

There is no particular limitation on the foaming structure, but the foaming structure is preferably determined so that the strength in the compression direction is high, for example, the material is foamed so as to be flat in the thickness direction.

Examples of the wood include a wood material, such as plywood, lauan materials, particle board, MDF, and the like.

There is no substantial limitation on the material, and a plurality of materials may be combined in use.

Examples of the porous inorganic material include, but are not limited to, various ceramic materials, plasterboard, concrete, foam glass, pumice stone, asphalt, clay materials, and the like.

The dielectric materials of the first spacer layer 32, the second spacer layer 33, and the coating material have to convert received radio wave energy into transmission energy while suppressing loss as much as possible, and thus, it is necessary to select a material in which energy loss due to the material is as low as possible. Accordingly, the dielectric tangent tan δ ($\in''/\in'$) for the frequency of electromagnetic waves used by the wireless IC tag for wireless communication is preferably 0.5 or less, and more preferably 0.2 or less. Due to the effect of suppressing energy loss, maintaining flexibility and lightness, and lowering price, foam is preferable as the material of the invention.

The spacer material preferably has both a low density and a low dielectric tangent tan δ ($\in''/\in'$), but it is more important for the spacer material to exert a low dielectric tangent tan δ in a communication frequency band (the UHF band, etc.).

Furthermore, when the real part $\in'$ of the complex relative permittivity is high, the sheet can be made thinner and smaller due to the wavelength-shortening effect, and thus, $\in'$ is preferably 1 to 10. Here, the sheet is deigned in view of various parameters, and thus, there is no limitation to this value.

The dielectric materials of the first spacer layer 32, the second spacer layer 33, and the coating material may be different dielectric materials, or may be the same dielectric material.

Figure 4:
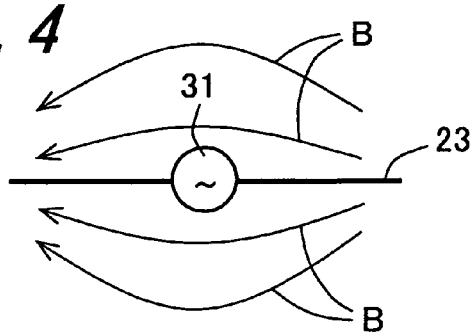
FIG. 4 is a front view schematically showing the antenna element 23 or the tag main body 22 (IC tag) disposed in free space.

FIG. 4 is a front view schematically showing the antenna element 23 or the tag main body 22 (IC tag) disposed in free space. The antenna element 23 or the tag main body 22 shown as an example in FIG. 4, as well as radio-wave-type antennas such as a dipole antenna, is designed under the assumption that the antenna is disposed in free space. Here, due to an alternating current, the direction of an electric field formed between dipole antennas alternately changes. FIG. 4 shows the direction of an electric field at a certain time. The input impedance of the chip 31 is caused to match the antenna element 23 under the conditions where the chip 31 is disposed in free space. Accordingly, in the state where the antenna element 23 or the tag main body 22 is disposed in free space, the electromagnetic field can be expanded around the antenna element 23 or the tag main body 22 (with respect to 360°) as indicated by arrows B, and thus, the communication efficiency can be improved, and the communication distance can be increased.

Figure 32:
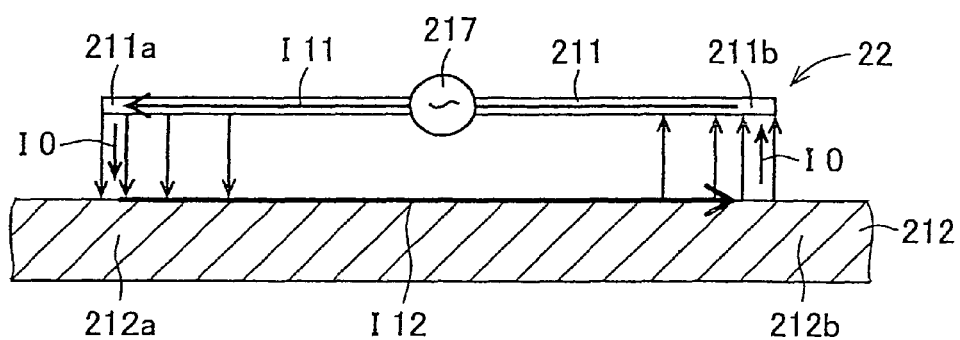
FIG. 32 is a cross-sectional view showing an electric field formed near a tag main body 22 (IC tag) in a state where the tag main body 22 is disposed near a conductive member.
Figure 33:
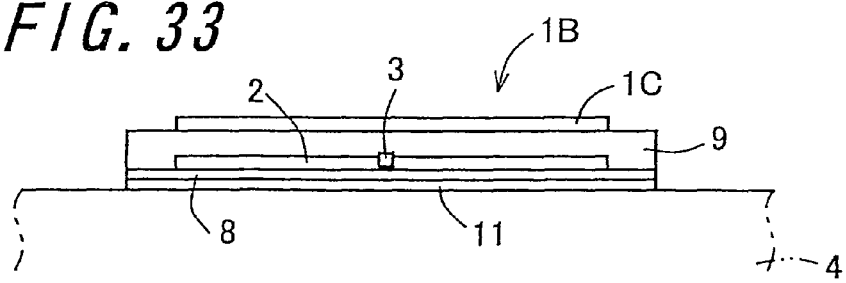
FIG. 33 is a cross-sectional view schematically showing an IC tag 1B according to still another conventional technique.

As shown in FIG. 32, also in the case where a conductive material, such as metal, is present near the tag main body 22 having, for example, a dipole antenna that performs radio-wave-type communication, communication becomes impossible through a mechanism different from that of the electromagnetic induction type, as described above. When reception by the tag main body 22 causes the current I11 to flow through the antenna element 211, the current I12 in the opposite direction is induced on the side of a nearby metal face, the induced current forms a loop-like current path, and the impedance is significantly lowered. Accordingly, the impedance does not match the input impedance of the IC chip 217 designed for communication in free space, transferring of energy and signals does not proceed, and the possible communication distance is shortened.

Figure 5:
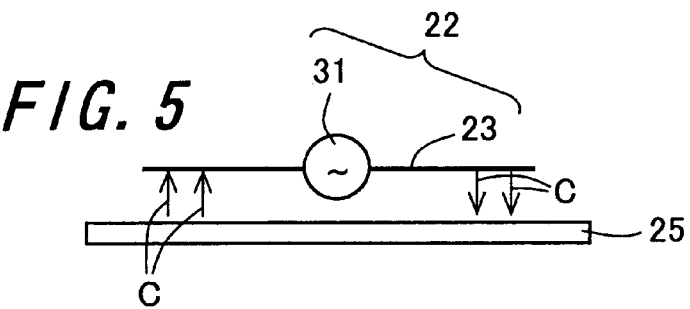
FIG. 5 is a front view illustrating a partial phenomenon in a state where a communication-jamming member is present nearby.

FIG. 5 is a front view illustrating a partial phenomenon in a state where a communication-jamming member as shown in FIG. 32 is present nearby. In a state where the antenna element 23 or the tag main body 22 of the radio wave type is disposed near the article 25, which is a communication-jamming member, electromagnetic fields are collectively formed between the antenna element 23 or the tag main body 22 and the article 25, which is a communication-jamming member, as indicated by arrows C. In this state, even when transfer is performed from the IC 31 to the antenna element 23, since the electromagnetic fields are collected between the antenna element 23 or the tag main body 22 and the article 25, which is a communication-jamming member, a phenomenon occurs in which electrical power supplied to the antenna element 23 cannot be radiated into space and returns to the IC 31, and the matching between the antenna element 23 and the IC 31 deteriorates. When the matching deteriorates in this manner, communication becomes impossible. In the case where electromagnetic waves are merely accumulated and cannot be radiated, the sheet member cannot be used for improving wireless communication even when operating as a resonator in this manner.

Figure 6:
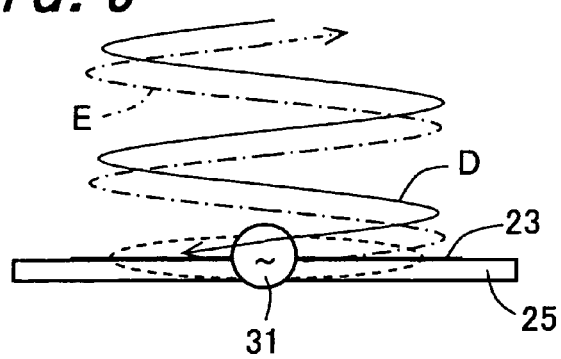
FIG. 6 is a front view schematically showing macroscopic arrival and reflection of radio waves at the antenna element 23 or the tag main body 22 disposed near the article 25, which is a communication-jamming member.

FIG. 6 is a front view schematically showing macroscopic arrival and reflection of radio waves at the antenna element 23 or the tag main body 22 disposed near the article 25, which is a communication-jamming member. In the case where electromagnetic waves arriving via the air from a distant place are reflected by the article 25, which is a communication-jamming member, near the antenna element 23 or the tag main body 22, the electromagnetic waves are reflected with the electric fields being in the opposite phase. Accordingly, in the state where the antenna element 23 or the tag main body 22 is disposed near the article 25, which is a communication-jamming member, due to the interference between direct waves (indicated by arrow D) arriving from the reader and reflected waves (indicated by arrow E) reflected by the article 25, which is a communication-jamming member, the composite electric field intensity is close to 0 at a position near the antenna element 23 or the tag main body 22. In this manner, the interference consumes energy, and thus, communication becomes impossible.

A mechanism for improving communication using a wireless IC tag by way of the sheet member and the auxiliary antenna of the invention is based on the following three facts. First, since the sheet member and the auxiliary antenna are arranged together, the resonance of the wireless IC tag near a communication-jamming member is improved. Secondly, since the configuration and the shape of the sheet member, the auxiliary antenna, and the discontinuous area are devised, and the arrangement position is examined, impedance matching is improved. Thirdly, as described above, since a low loss material with low energy loss that collects and passes radio waves therethrough is used as a constituent material, a low energy loss configuration is realized. Hereinafter, these aspects will be described.

In the invention, as shown in FIGS. 1 to 3, the sheet member 20 having the resonant layer 27 is disposed between the antenna element 23 or the tag main body 22 and the communication-jamming member 25. The resonant layer 27 forms a microstrip antenna 35 that is an auxiliary antenna in cooperation with the reflecting layer 28. A microstrip antenna is an antenna that is also referred to as a patch antenna, and thus, the sheet member 20 is an auxiliary antenna including a patch antenna. Radio waves are received and radiated as in the case of a patch antenna. A patch antenna is an antenna in which the size is determined according to the wavelength at the resonant frequency, and thus, this antenna is typically used at an ultra-high frequency (the UHF band) or higher frequency. More specifically, this antenna is an antenna in which, when the length of the conductor is ½ the wavelength, stationary waves emerge and resonance occurs. The patch antenna includes a conductor layer functioning as a ground plate, and can be used while suppressing the influence of a communication-jamming member when the ground plate is disposed on the side of the communication-jamming member in use. In the sheet member 20 or the auxiliary antenna 35, the reflecting layer 28, among two conductor layers consisting of the resonant layer 27 and the reflecting layer 28 forming the patch antenna, functions as a ground plate, and thus, when the reflecting layer 28 is disposed on the side of the article 25 in use, the auxiliary antenna itself operates as a stable antenna without receiving the influence of the article 25. As described above, due to the effect obtained by combining the wireless IC tag with the sheet member or the auxiliary antenna, a stable resonant state of the antenna is secured even near the communication-jamming member 25. In the case where the auxiliary antenna 35 is stacked on an article that is of a conductive substance, such as metal, this article also functions as the reflecting layer 28, and thus, the reflecting layer 28 is not absolutely necessary, and a similar effect can be obtained even without the reflecting layer 28.

Moreover, when the discontinuous area 40 in the shape of a slit, a slot, or the like is disposed in the resonant layer 27 of the sheet member 20 or the auxiliary antenna 35 in this state, an area in which the electric field is low but the magnetic field is intensive inside the patch antenna is used so that intensive electromagnetic coupling is formed through that area, and wireless communication using the antenna element 23 or the tag main body 22 is improved. Furthermore, the sheet member 20 or the auxiliary antenna 35 having this sort of discontinuous area 40 is interposed between the antenna element 23 or the tag main body 22 and the article 25, the influence of the article 25 on the antenna element 23 or the tag main body 22 can be alleviated. As a result, the electromagnetic coupling between the antenna element 23 or the tag main body 22 and the sheet member 20 or the auxiliary antenna 35 becomes more intensive near the article 25, and thus, resonance can be obtained, and simple impedance matching can be performed by simply changing the arrangement position without a wired connection.

The resonant layer 27 of the sheet member 20 or the auxiliary antenna 35 resonates with electromagnetic waves at the communication frequency. Accordingly, the auxiliary antenna 35 of the sheet member 20 resonates with electromagnetic waves at the communication frequency. In the case where this auxiliary antenna 35 is disposed, energy from the electromagnetic waves received by the auxiliary antenna 35 is supplied to the antenna element 23 or the tag main body 22. In this manner, the antenna element 23 or the tag main body 22 obtains energy also from the auxiliary antenna 35. When the antenna element 23 or the tag main body 22 is simply disposed without a wired connection to the auxiliary antenna 35, radiation from the auxiliary antenna 35 also can be used to discharge energy, and signals from the IC 31 can be discharged into space with a large radiative power. The auxiliary antenna 35 including a patch antenna is an antenna in which the electric field in an area near the middle portion of, in particular, the resonant layer 27 among two conductor layers during resonance is 0. Since the electric field is 0, this state is equivalent to a state in which an electrical short circuit occurs. Thus, even when a via-hole or the like is disposed in this area and an electrical short circuit is caused, the operation thereof is not affected.

Here, the sheet member 20 does not use the resonant layer 27, which is the first conductor layer among the conductor layers 27 and 28 of the auxiliary antenna 35, as a so-called reflector. In order to obtain the reflection effect from the reflector, the reflector has to be away from the antenna element 23 or the tag main body 22 by an electrical length of ¼λ (λ=wavelength of electromagnetic waves at the communication frequency), but such a distance is not provided therebetween in the sheet member 20. The spacing between the antenna element 23 or the tag main body 22 and the resonant layer 27 is less than one fourth of the wavelength λ of electromagnetic waves at the communication frequency, so that the thickness of the tag 21 is reduced. The auxiliary antenna 35 causes a large current to flow through the antenna element 23 or the tag main body 22 not using the reflection effect but using electromagnetic coupling with the antenna element 23 or the tag main body 22, and thus, the communication efficiency is improved, and the communication distance is increased.

Furthermore, the resonant frequency of the auxiliary antenna 35 can be easily changed by changing the shape and the size of the auxiliary antenna 35 of the sheet member 20. Accordingly, an auxiliary antenna 35 having a resonant frequency that matches the communication frequency according to the configuration of the tag main body 22 can be obtained, and this auxiliary antenna 35 can be applied to the tag main body 22 having various electric-field-type antenna elements 23, thereby forming the tag 21. Moreover, this sort of antenna for wireless communication can improve wireless communication in a similar manner using the action of the invention regardless of the wireless IC tag.

FIGS. 7A to 7J are plan views showing examples of the shape of the resonant layer 27. The direction parallel to one side of the resonant layer 27 (e.g., the horizontal direction in FIG. 7) is taken as a first direction x, and the direction parallel to the other side and perpendicular to the first direction x (e.g., the vertical direction in FIG. 7) is taken as a second direction y. As shown in FIGS. 7A to 7J, the discontinuous area 40 is formed by partially cutting the rectangular shape of the resonant layer 27. The outline of the resonant layer 27 or the discontinuous area 40 may be any shape, such as a rectangle, a square, a polygon, an ellipse, a circle, an irregular shape, or the like. There is no limitation on not only the shape but also the number.

Figure 7A:
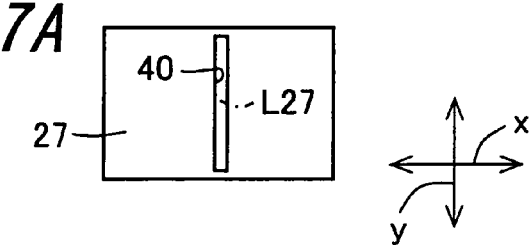
FIG. 7A is a plan view showing an example of a shape of the resonant layer 27.
Figure 7B:
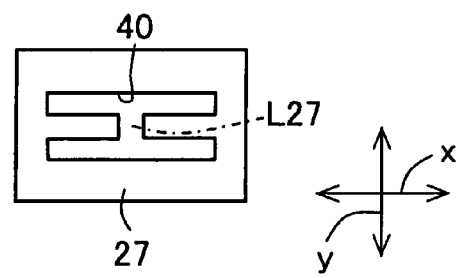
FIG. 7B is a plan view showing an example of a shape of the resonant layer 27.
Figure 7C:
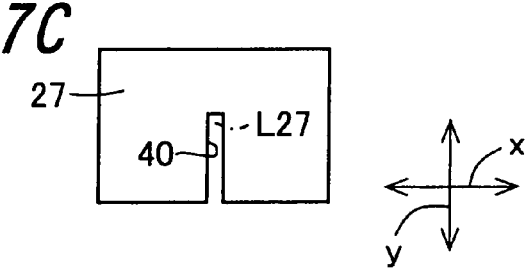
FIG. 7C is a plan view showing an example of a shape of the resonant layer 27.
Figure 7D:
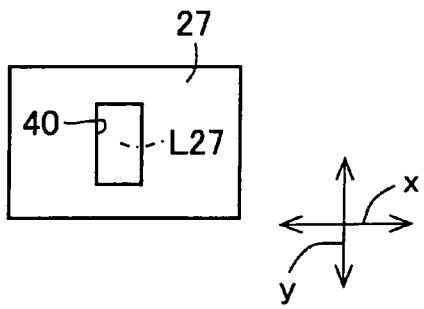
FIG. 7D is a plan view showing an example of a shape of the resonant layer 27.
Figure 7E:
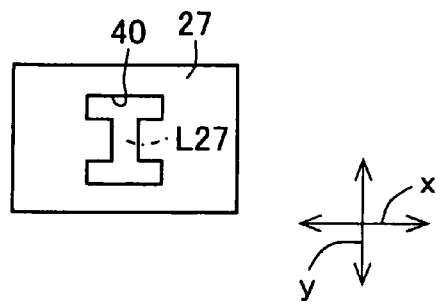
FIG. 7E is a plan view showing an example of a shape of the resonant layer 27.
Figure 7F:
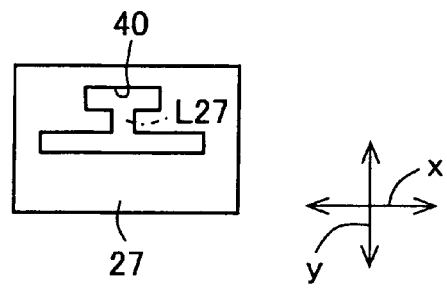
FIG. 7F is a plan view showing an example of a shape of the resonant layer 27.
Figure 7G:
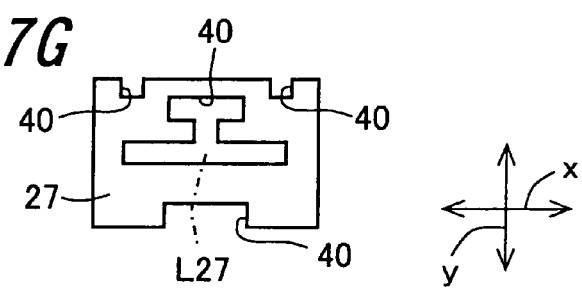
FIG. 7G is a plan view showing an example of a shape of the resonant layer 27.
Figure 7H:
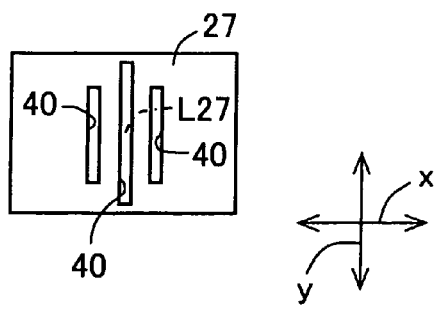
FIG. 7H is a plan view showing an example of a shape of the resonant layer 27.
Figure 7I:
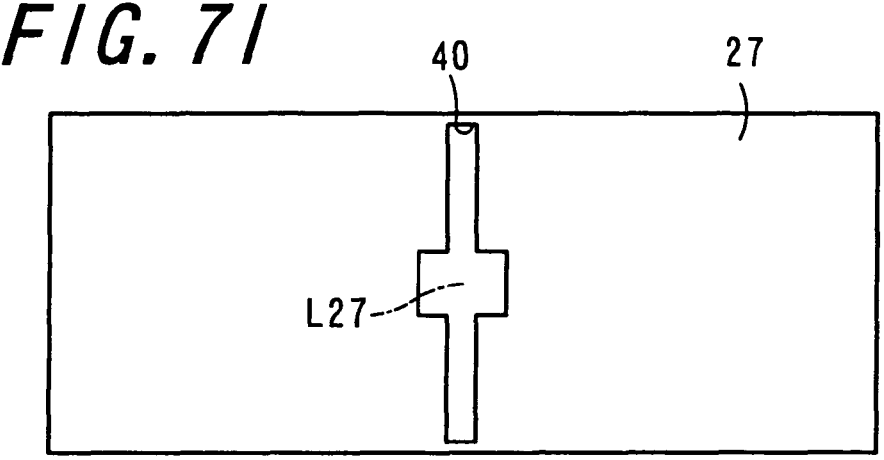
FIG. 7I is a plan view showing an example of a shape of the resonant layer 27.
Figure 7J:
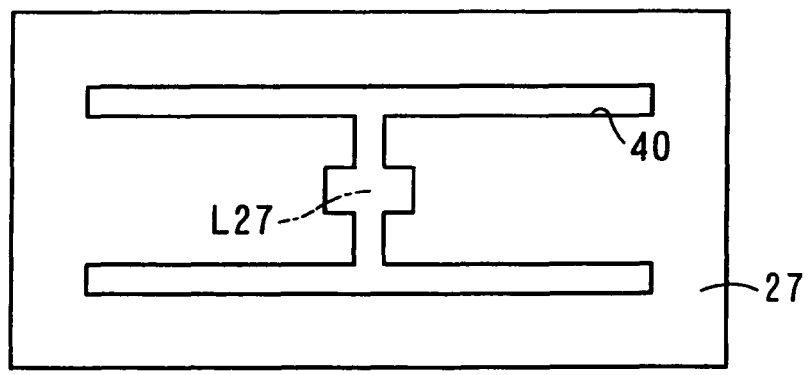
FIG. 7J is a plan view showing an example of a shape of the resonant layer 27.

As shown in FIG. 7A, the discontinuous area 40 may be formed in the shape of an elongated rectangle extending in the second direction y, at the center portion in the first and the second directions x and y. As shown in FIG. 7B, the discontinuous area 40 may be formed in the shape of an H in which rectangular portions extending in the first direction x are linked at the center portion in the first and the second directions x and y. As shown in FIG. 7C, the discontinuous area 40 may be formed as a cutout extending from the end portion of the resonant layer 27, at the center portion in the first direction x. As shown in FIG. 7D, the discontinuous area 40 may be formed in the shape of a rectangle in which the long sides are parallel to the second direction y, at the center portion in the first and the second directions x and y. As shown in FIG. 7E, the discontinuous area 40 may be formed in the shape of an H in which short rectangular portions extending in the first direction x are linked at the center portion in the first and the second directions x and y. As shown in FIG. 7F, the discontinuous area 40 may be formed in the shape of an H with uneven sides in which parallel rectangular portions having different lengths are linked at a position shifted from the center portion in the first and the second directions x and y to one side in the second direction y. As shown in FIG. 7G, the discontinuous area 40 may be formed to have rectangular cutouts at both end portions in the second direction y in addition to the configuration in FIG. 7F. As shown in FIG. 7H, the discontinuous area 40 may be formed in the shape of three lines with two different lengths in which slightly shorter elongated rectangles are arranged in parallel to the configuration in FIG. 7A on both sides in the first direction x. FIGS. 7I and 7J show examples in which the discontinuous area 40 in FIGS. 7A and 7B is further modified. The width of the discontinuous area 40 at a position near the center is increased from that of the other portions, and thus, the influence on the IC chip 31 or the tag main body 22 is further reduced. Here, there is no limitation to the above-described shapes, and the shape may be any shape.

In the resonant layer 27, only one discontinuous area 40 may be formed as shown in FIGS. 7A, 7B, 7D to 7F, 7I, and 7J, or a plurality of discontinuous areas 40 may be formed as shown in FIG. 7G and FIG. 7H. Furthermore, in the resonant layer 27, the discontinuous area 40 may be formed so as to be symmetrical with respect to the central axis L27 that passes through the center of the resonant layer 27 as shown in FIGS. 7A, 7B, 7D, 7E, 7H, 7I, and 7J, or the discontinuous area 40 may be formed so as to be asymmetrical with respect to the central axis L27 that passes through the center of the resonant layer 27 as shown in FIGS. 7C, 7F, and 7G. Furthermore, in the resonant layer 27, only the discontinuous area 40 in the shape of an opening(s) in which the entire circumference is surrounded by the resonant layer 27 may be formed as shown in FIGS. 7A, 7B, 7D, 7E, 7F, 7G, 7I, and 7J, the discontinuous area 40 in the shape of an opening and the discontinuous areas 40 in the shape of cutouts that are partially open and linked to the outside of the resonant layer 27 may be formed as shown in FIG. 7G, or only the discontinuous area 40 in the shape of a cutout may be formed as shown in FIG. 7C. As long as the discontinuous area 40 is present, there is no particular limitation on the shape and the configuration thereof. A plurality of discontinuous areas 40 may be present or combined. Furthermore, the discontinuous area 40 may be a cutout that completely divides the resonant layer 27. Furthermore, the shape of the discontinuous area 40 may be any shape, such as a line, a line, a bar, a circle, an arc, a curved line, an irregular shape, or the like, as well as a polygon. These shapes may be distributed in the vertical direction.

Furthermore, the resonant layer 27 may be obtained by arranging one or a plurality of resonant units as elements (conductor elements). In this case, the conductor elements are insulated from each other, and the capacitor formed by the spacing therebetween affects the resonant frequency. The insulating portion in this spacing is also encompassed by the scope of the discontinuous area 40 of the invention.

When at least part of the outline portion of the resonant layer 27, the discontinuous area 40, or the conductor element is in the shape of a curved line, the antenna properties are stable regardless of the angular and positional relationship of an antenna portion of the resonant layer 27, the discontinuous area 40, the conductor element, or the like with respect to the polarization direction viewed in the incident direction of radio waves. That is to say, when radio waves with circular polarization are received, a stable resonance can be realized in which the receiving properties are less dependent on the angle with respect to the polarization plane of radio waves of the antenna portion.

In the case where the discontinuous area 40 is formed in the resonant layer 27 as shown in FIGS. 7A to 7J, the discontinuous area 40 can function as an antenna. Accordingly, in addition to the above-described auxiliary antenna 35, the discontinuous area 40 can be provided as an antenna. In the case where the discontinuous area 40 is formed so as to resonate with electromagnetic waves at the communication frequency, the energy of electromagnetic waves received by the discontinuous area 40 can be transferred to the antenna element 23 or the tag main body 22. Moreover, when the discontinuous area 40 resonates, a resonant current flows along the periphery of the discontinuous area 40 on both faces of the resonant layer 27, and thus, more intensive electromagnetic coupling can be formed (impedance matching can be performed), or the radiating efficiency of the wireless IC tag 21 can be improved. At that time, the resonant layer 27 may resonate only at the discontinuous area 40.

In the case where the discontinuous area 40 functions as an antenna, the frequency properties vary depending on the shape and the size of the periphery of the discontinuous area. The shape and the size of the discontinuous area 40 are determined according to the frequency properties that are to be obtained. For example, a slot antenna resonates when the peripheral length of the slot is the same as the wavelength of electromagnetic waves. Typically, this antenna is used at a frequency in a very high frequency band (30 MHz to 300 MHz) or higher. In this manner, radiation from the discontinuous area 40 is also part of the radiation from the auxiliary antenna 35. In the case where a discontinuous area 40 in the shape of an elongated line, such as an elongated rectangle, is formed, the discontinuous area 40 is positioned so as to cross perpendicular to the tag main body 22, and thus, the electric field formed so as to cross the slot-like discontinuous area 40 becomes more intensive due to the electric field (electric force lines) formed so as to link the longitudinal direction of the tag main body 22, and a current formed around the slot increases. Moreover, when a discontinuous area 40 in which the difference between the longitudinal size and the width size is small is formed by increasing the line width, the electric field formed at the slot-like discontinuous area 40 becomes less intensive, and a current formed around the slot also decreases. Moreover, when an asymmetric discontinuous area 40 is formed, for example, by combining rectangles having different length sizes, a complex electric field or current can be formed. Thus, a frequency range having a large receiving intensity can be large, or a plurality of resonant frequencies can be provided, and thus, frequency properties that make it possible to perform wideband reception are obtained. Furthermore, when a wider bandwidth is obtained in this manner, the antenna structure can be made asymmetrical by forming the discontinuous area 40 at a position shifted from the center of the resonant layer 27, and thus, a plurality of portions that can resonate are obtained, and a wider bandwidth can be obtained.

Here, the discontinuous area 40 does not necessarily have to resonate. Even in the case where the discontinuous area 40 does not resonate, the resistance in a current path of an induced current formed on the first conductor layer 27 of the auxiliary antenna 35 can be increased, and a decrease in the impedance of the antenna element 23 or the tag main body 22 can be suppressed.

When the shape of the discontinuous area 40 is changed or a plurality of discontinuous areas 40 are combined, the electromagnetic coupling between the auxiliary antenna 35 and the antenna element 23 or the tag main body 22 can be made more intensive, a wider bandwidth can be obtained, or resonance can be increased. Furthermore, a design that supports the effect of the auxiliary antenna can be obtained using the resonant effect.

Figure 8:
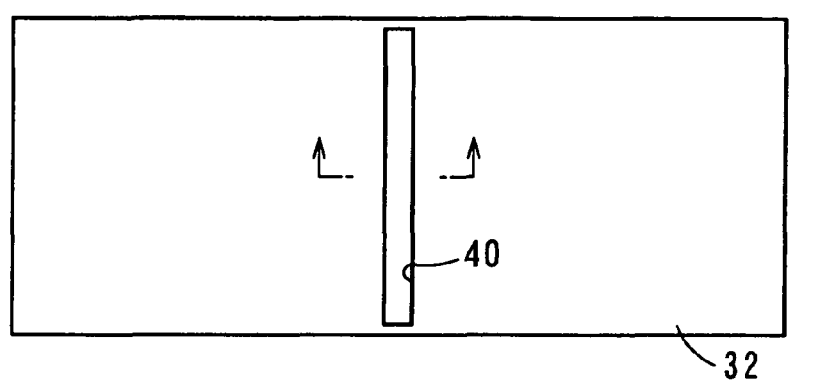
FIG. 8 is a plan view of the sheet member 20 according to an embodiment of the invention.
Figure 9:
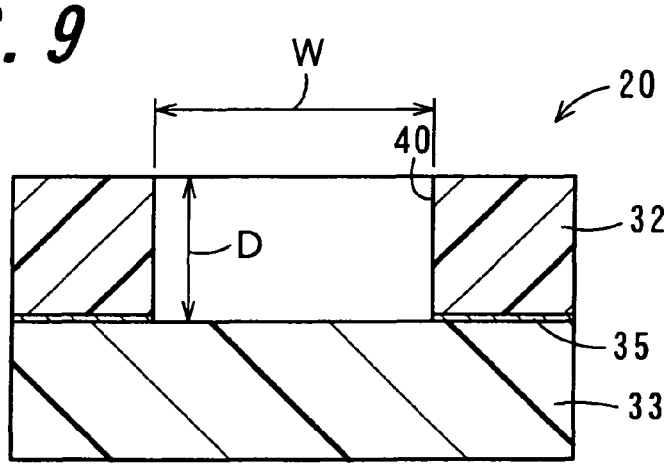
FIG. 9 is an enlarged cross-sectional view of the sheet member 1.

FIG. 8 is a plan view of the sheet member 20 according to an embodiment of the invention. FIG. 9 is an enlarged cross-sectional view of the sheet member 1. The case in which the sheet member 20 having the shape shown in FIG. 8 is used is referred to as Embodiment A.

As shown in the cross-sectional view in FIG. 9, the discontinuous area 40 passes through the first spacer 32 and the auxiliary antenna 35 in the stacked direction, and, as a result, the second spacer 33 forms the bottom of the groove. Accordingly, the depth D of the discontinuous area 40 is the same as the total thickness of the first spacer 32 and the auxiliary antenna 35, and is, for example, 0.1 to 20 mm.

The length L of the discontinuous area 40 is set to 1 to 1000% of the length L0 in the short side direction of the sheet member 20. The total length is, for example, 1 to 500 mm including a bent portion, if any.

The width W of the discontinuous area 40 is, for example, 0.1 to 50 mm although depending on the size or the like of the IC chip, a joint portion thereof, and the reactance loading portion. When this discontinuous area 40 is so disposed, the dipole antenna of the wireless IC tag and the auxiliary antenna 35 arranged without a wired connection are electromagnetically coupled via the discontinuous area 40, and the auxiliary antenna 35 functions as a resonant antenna. Moreover, since the discontinuous area 40 is disposed directly below the wireless IC tag, the IC chip is affected less by the resonant layer, which is a conductor of the auxiliary antenna 35, functioning as a communication-jamming member (nearby metal).

The discontinuous area 40 can be formed by a common forming method. The first spacer 32 may be subjected to mechanical processing such as punching or cutting, or chemical treatment such as etching, thereby removing a predetermined portion that is to be the discontinuous area 40 from a plate member made of a dielectric material. Furthermore, in some cases, the dielectric material used can be shaped into a shape having the discontinuous area 40 in advance during the shaping process.

Also, the auxiliary antenna 35 may be subjected to mechanical processing or chemical treatment, thereby removing a predetermined portion that is to be the discontinuous area 40, as in the case of the first spacer 32. Furthermore, printing, evaporation, coating can be directly performed on the spacer in advance so that the spacer has a slit, a slot, or the like.

Using this sort of method, the discontinuous area 40 may be formed in each of the first spacer 32 and the auxiliary antenna 35, or the auxiliary antenna 35 may be stacked in advance on the first spacer 32 and then the discontinuous area 40 may be simultaneously formed in the first spacer 32 and the auxiliary antenna 35.

The discontinuous area 40 of the invention is essential in the auxiliary antenna 35, but is not absolutely necessary in the reflecting layer 28. In a similar manner, the discontinuous area 40 may or may not be present in the first spacer 32 and the second spacer 33. It is required by the invention to provide the discontinuous area 40 in the closest conductor layer.

Figure 10:
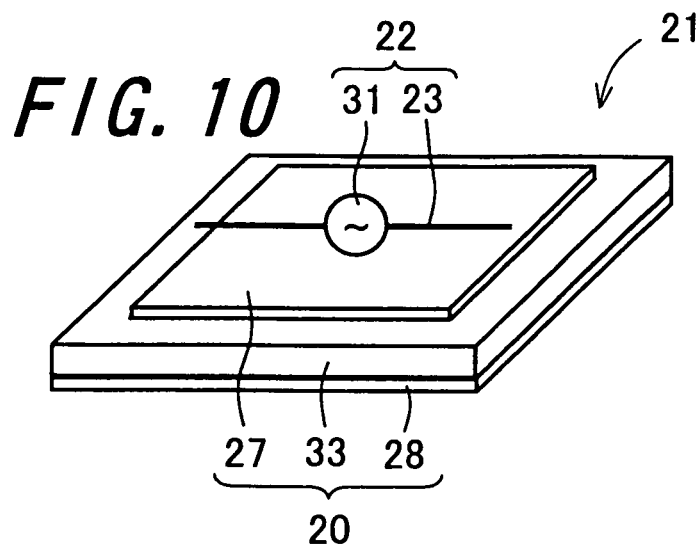
FIG. 10 is a perspective view showing the tag 21 according to Comparative Example in which a resonant layer 27 without the discontinuous area 40 is disposed.

FIG. 10 is a perspective view showing the tag 21 according to Comparative Example in which a resonant layer 27 without the discontinuous area 40 is disposed. In FIG. 10, the substrate 30 is omitted. When using the resonant layer 27 without the discontinuous area 40, the antenna element 23 and the IC 31 are arranged such that the IC 31 overlaps the center of the resonant layer 27 and that the antenna element 23 extends in parallel or substantially parallel to one side of the resonant layer 27.

Figure 11:
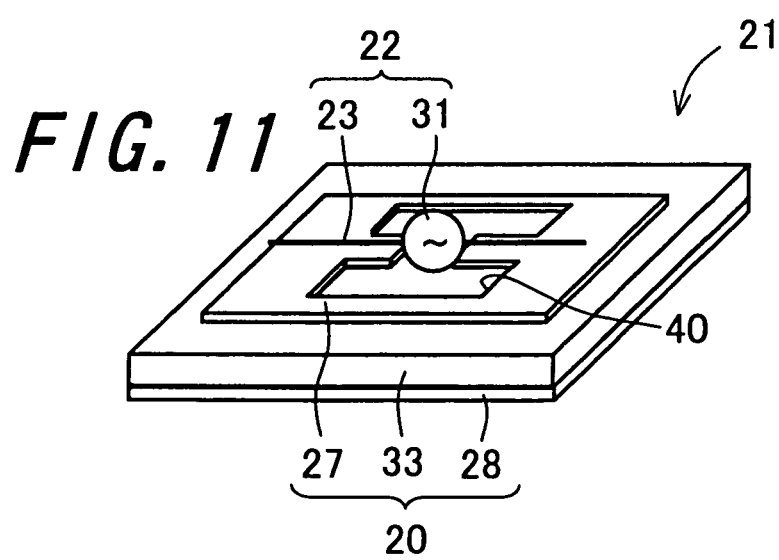
FIG. 11 is a perspective view showing the tag 21 in which a resonant layer 27 with a discontinuous area 40 in the shape of an H-shaped slot shown in FIG. 8B is disposed.

FIG. 11 is a perspective view showing the tag 21 in which a resonant layer 27 with a discontinuous area 40 in the shape of an H-shaped slot shown in FIG. 8B is disposed. This configuration is referred to as Embodiment B. In FIG. 11, the substrate 30 is omitted. When using a resonant layer 27 in which a discontinuous area 40 that looks like an H when viewed in the direction where the first direction x is the upper-and-lower direction is formed at the center portion of the resonant layer 27, the antenna element 23 and the IC 31 are arranged such that the IC 31 overlaps substantially the center position of the resonant layer 27 and that the antenna element 23 or the tag main body 22 extends in the first direction x. In this state, the position of the IC 31 or the reactance loading portion overlaps the discontinuous area 40.

Figure 12:
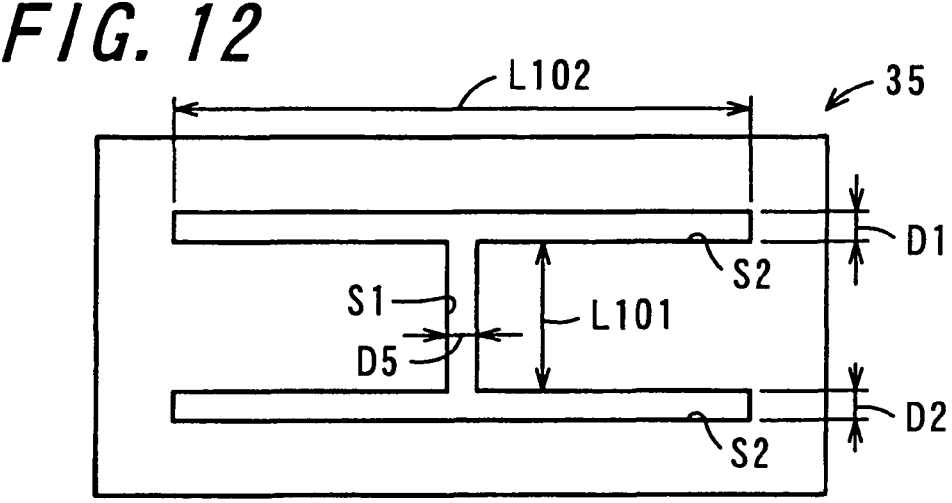
FIG. 12 is a plan view of the sheet member 20 according to Embodiment B.

FIG. 12 is a plan view of the sheet member 20 according to Embodiment B.

As the discontinuous area 40, an opening S1 in the shape of a straight line parallel to the short side direction is disposed at the center portion in the long side direction of the auxiliary antenna 35, and openings S2 in the shape of two straight lines parallel to the long side direction are arranged with a predetermined spacing interposed therebetween in the short side direction. The opening S1 and the openings S2 intersect each other at the center portion, and the opening S1 in the shape of a straight line does not project out of the openings S2.

The cross section of the opening S1 and the openings S2 is as shown in the cross-sectional view in FIG. 9 of Embodiment A. That is, the opening S1 and the openings S2 pass through the first spacer 32 and the auxiliary antenna 35 in the stacked direction, and as a result, the second spacer 33 forms the bottom of the groove. Furthermore, the opening S1 and the openings S2 have the same depth and the same width.

The depth D of the openings S2 is the same as the total thickness of the first spacer 32 and the auxiliary antenna 35, and is, for example, 0.1 to 20 mm. The width W of the opening S1 and the openings S2 is, for example, 1 to 30 mm although depending on the size or the like of the IC chip, a joint portion thereof, and the reactance loading portion.

The length L101 of the opening S1 is, for example, 5 to 100 mm, and the length L102 of the openings S2 is, for example, 30 to 500 mm.

When the opening S1 and the openings S2 are arranged, the dipole antenna of the wireless IC tag and the auxiliary antenna 35 arranged are electromagnetically coupled via the opening S1 and the openings S2, and the auxiliary antenna 35 functions as a resonant antenna. Moreover, since the opening S1 is disposed directly below the wireless IC tag, and the openings S2 are arranged near the reactance loading portion of the dipole antenna, the IC chip and the reactance loading portion are affected less by the auxiliary antenna 35 as a nearby conductor (that functions as a communication-jamming member).

Figure 13:
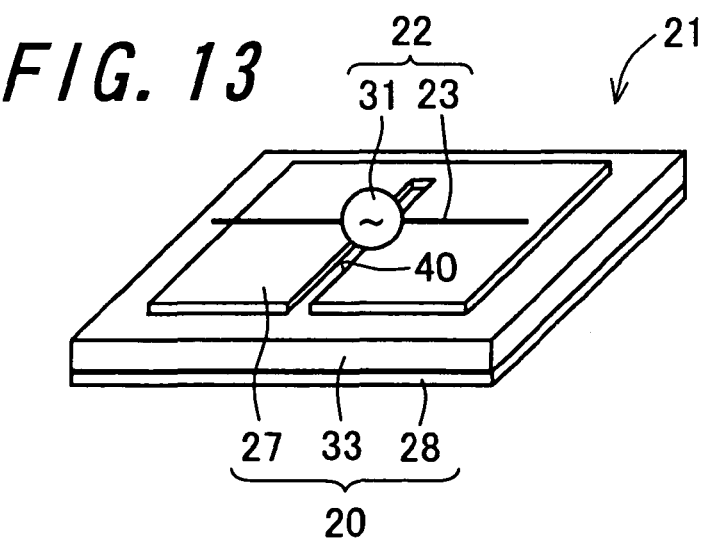
FIG. 13 is a perspective view showing the tag 21 in which the resonant layer 27 with the slit-like discontinuous area 40 shown in FIG. 8C is disposed.

FIG. 13 is a perspective view showing the tag 21 in which the resonant layer 27 with the slit-like discontinuous area 40 shown in FIG. 8C is disposed. This configuration is referred to as Embodiment C. In FIG. 13, the substrate 30 is omitted. When using a resonant layer 27 in which a discontinuous area 40 that is in the shape of a rectangle extending from the end portion of the resonant layer 27 in the second direction y is formed at the center portion of the resonant layer 27, the antenna element 23 and the IC 31 are arranged so that the IC 31 overlaps substantially the center position of the resonant layer 27 and that the antenna element 23 or the tag main body 22 extends in the first direction x. In this state, the position of the IC 31 or the reactance loading portion overlaps the discontinuous area 40.

When using the resonant layer 27 in which the discontinuous area 40 is formed as shown in FIGS. 11 to 13, the discontinuous area 40 and the IC 31 or the reactance loading portion preferably overlap each other. When the discontinuous area 40 and the IC 31 or the reactance loading portion overlap each other in this manner, the influence of the resonant layer 27 on the impedance of the antenna element 23 or the tag main body 22 can be suppressed. Furthermore, impedance matching can be optimized depending on the arrangement position. Accordingly, electrical power can be easily supplied from the IC 31 to the antenna element 23 or the tag main body 22, and the communication efficiency can be improved.

Figure 14:
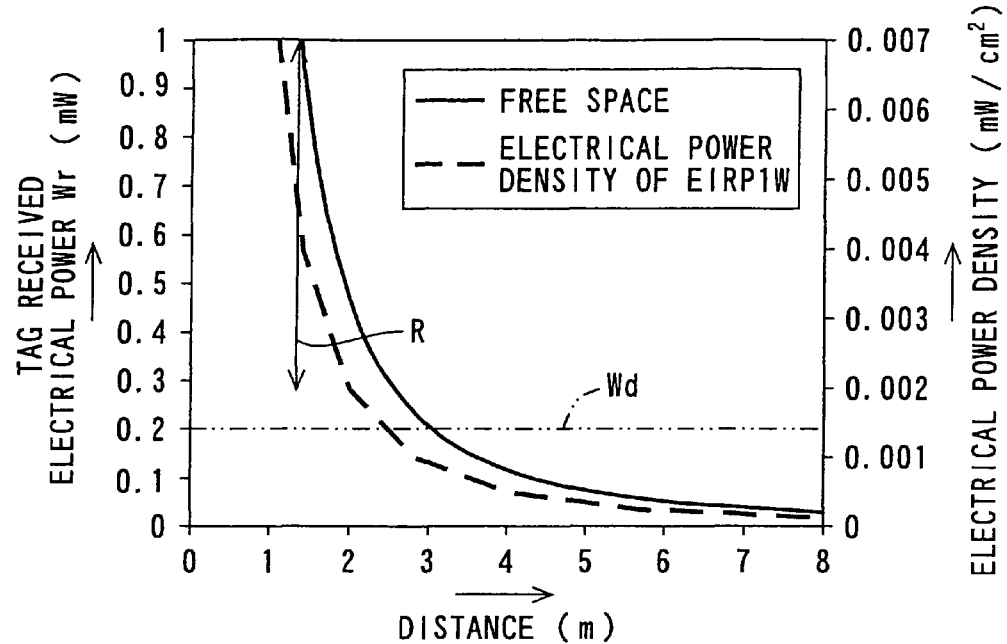
FIG. 14 is a graph for illustrating a method for approximating communication distance.

FIG. 14 is a graph for illustrating a method for approximating communication distance. In FIG. 14, the horizontal axis indicates a distance from the reader, and the vertical axes indicate received electrical power and electrical power density. The maximum distance at which communication can be performed by the tag 21 (hereinafter, referred to as "communication distance") is a distance between the position at which the tag 21 is disposed, and the position at which a state where communication is possible is changed into a state where communication is impossible as the tag 21 is relatively displaced away from the reader. In the tag 21, the electrical power necessary for the tag 21 to operate (hereinafter, referred to as "operational electrical power") Wd is determined. In the case where the electrical power received by the tag 21 (hereinafter, referred to as the "received electrical power") Wr is equal to or larger than the operational electrical power Wd (Wr≥Wd), the tag 21 can perform communication. In the case where the received electrical power Wr is smaller than the operational electrical power Wd (Wr<Wd), the tag 21 cannot perform communication. The communication distance is the distance from the reader to the tag 21 in the case where the received electrical power Wr is equal to the operational electrical power Wd.

The received electrical power of the tag 21 is proportional to a working gain of the tag 21, and proportional to the electrical power density of electromagnetic waves from the reader. The density of electrical power arriving at the tag is inversely proportional to the square of the distance from the reader. Accordingly, when the ratio between the working gain of the tag 21 and a working gain in the case where the tag main body 22 is in free space is obtained, it is possible to approximate the ratio between the communication distance of the tag 21 and the communication distance in the case where the tag main body 22 is in free space. As shown in FIG. 14, the ratio of communication distance=√(ratio R of working gain) (shown in FIG. 14). In this manner, the communication distance of the tag 21 can be approximated.

Figure 15:
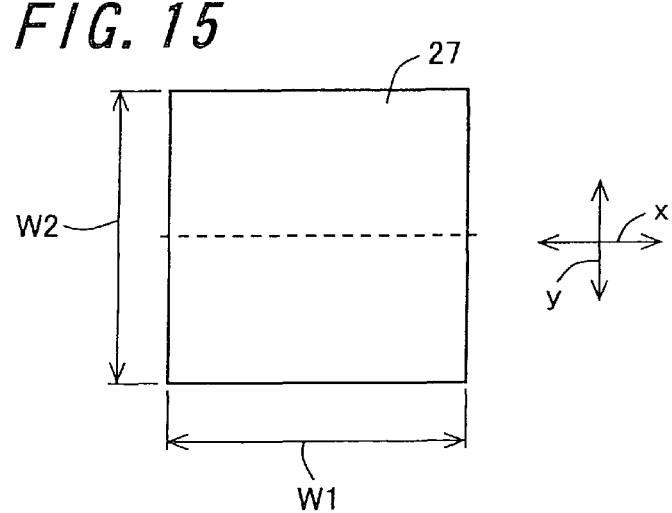
FIG. 15 is a plan view showing the resonant layer 27 used for evaluating the performance of the tag 21.

FIG. 15 is a plan view showing the resonant layer 27 used for evaluating the performance of the tag 21. The resonant layer 27 in the Comparative Example shown in FIG. 15 is in the shape of a rectangle, and no discontinuous area 40 is formed therein. The size in the first direction x parallel to one side of the resonant layer 27 is taken as a first size (side length) W1, and the size in the second direction y perpendicular to the first direction x and parallel to the other side of the resonant layer 27 is taken as a second size (width) W2.

Figure 16:
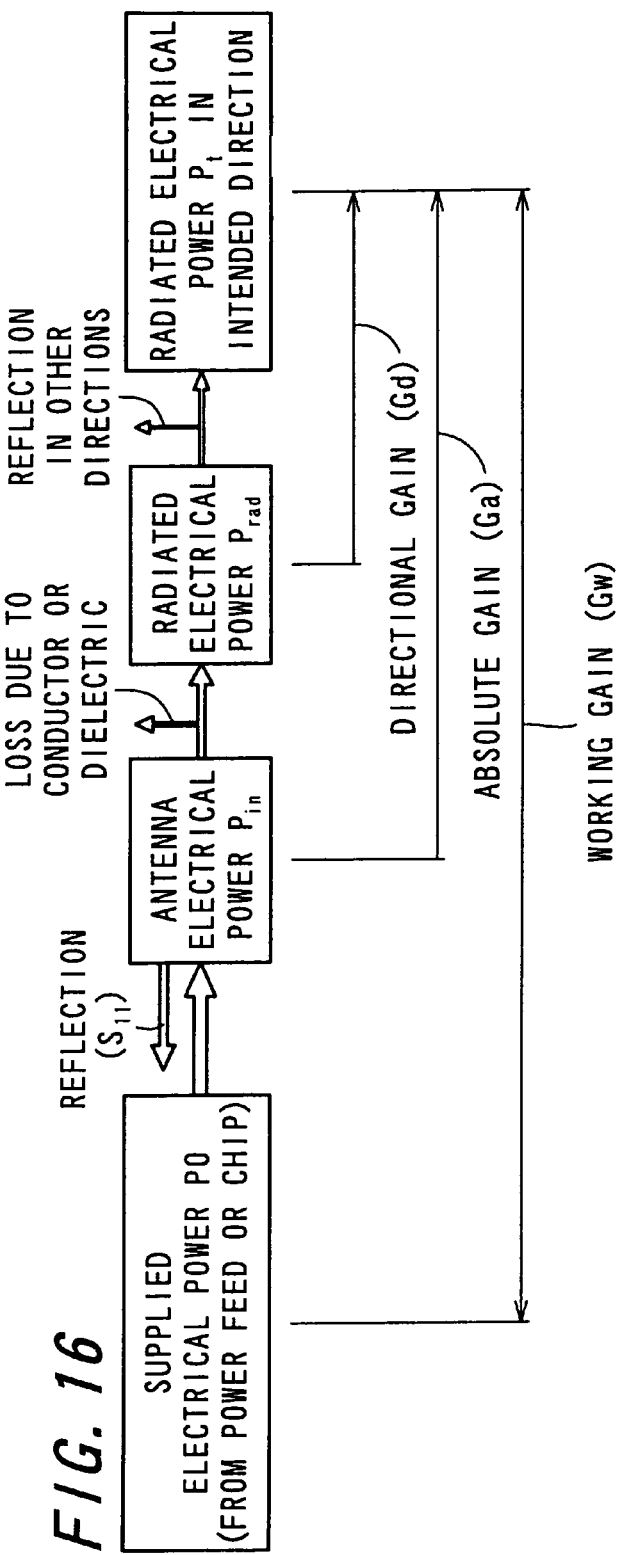
FIG. 16 is a diagram for illustrating the gain of the tag 21.

FIG. 16 is a diagram for illustrating the gain of the tag 21. In the tag 21, the antenna element 23 or the tag main body 22 converts electrical signals and electromagnetic wave signals from one to the other. As the conversion efficiency between the electricity-related electrical power of electrical signals and the electromagnetic wave-related electrical power of electromagnetic wave signals is higher, the performance is higher. The transmission performance and the reception performance match each other in the tag 21, and the reception performance is high when the transmission performance is high. Here, the gain of the antenna element 23 or the tag main body 22 will be described using an example in which transmission is performed by the antenna element 23.

Electrical power is supplied from the IC 31, which is supplying means, to the antenna element 23, and the electrical power is radiated from the antenna element 23 as electromagnetic waves. Here, the electrical power supplied form the IC 31 to the antenna element 23 is supplied electrical power P0, and only part of the supplied electrical power P0 is inputted into the antenna element 23. The electrical power actually inputted into the antenna element 23 is antenna electrical power Pin, and the degree of the supplied electrical power P0 inputted is a reflection property value S11. Of the antenna electrical power Pin, the electrical power radiated as electromagnetic waves is radiated electrical power Prad. The radiated electrical power Prad is electrical power excluding losses caused by the antenna element 23 or an object present nearby. Moreover, of the radiated electrical power Prad, electrical power radiated as electromagnetic waves in communication direction A, which is the direction in which electrical power is to be radiated, excluding electrical power radiated in directions other than the communication direction A is directionally radiated electrical power Pt.

The gain includes a working gain Gw, an absolute gain Ga, and a directional gain Gd. The working gain Gw indicates the degree of the directionally radiated electrical power Pt obtained with respect to the supplied electrical power P0. The absolute gain Ga indicates the degree of the directionally radiated electrical power Pt obtained with respect to the antenna electrical power Pin. The directional gain Gd indicates the degree of the directionally radiated electrical power Pt obtained with respect to the radiated electrical power Prad. In this manner, the gain is an indicator indicating the electrical power conversion efficiency.

The reflection property value S11 is an evaluated value of supply matching, can be used for evaluating resonant frequency, is expressed by Expression (1), and is preferably as small as possible. The energy-transferring efficiency (Pin/P0) at the supply portion is expressed by Expression (2). Furthermore, when the impedance of the antenna element 23 is taken as Z11, the impedance of the IC 31 is taken as Zport, and the complex number conjugate to the impedance of the IC 31 is taken as Z*port, the relationship of Expression (3) is obtained. Moreover, the radiating efficiency η is expressed by Expression (4).

$$S11 \text{ (dB)} = 10 \times \log((P0 - Pin)/P0) \qquad (1)$$

$$Pin/P0 = 1 - 10^{(S11/10)} \qquad (2)$$

$$|S11|(\text{Absolute value}) = |(Z11 - Z^*port)/(Z11 + Zport)| \qquad (3)$$

$$\eta = Prad/Pin = 10^{((Ga - Gd)/10)} \qquad (4)$$

As the gain becomes larger, the communication distance becomes larger, and a preferable configuration is realized. Accordingly, when the electrical power conversion efficiency increases, and the gain increases, a preferable configuration is obtained. In the case where the antenna element 23 or the tag main body 22 is used near the article 25, which is a communication-jamming member, without using the sheet member 20 or the auxiliary antenna 35, the loss at the article 25 increases, and the conversion efficiency from the antenna electrical power Pin to the radiated electrical power Prad deteriorates. Furthermore, when an object that functions as a communication-jamming member is present near the antenna element 23 or the tag main body 22, the impedance Z11 of the antenna element 23 or the tag main body 22 changes, the difference between the impedance Z11 and the impedance Zport of the IC 31 increases, the reflection property value S11 increases, and the supply matching deteriorates.

When the sheet member 20 or the auxiliary antenna 35 is used, the negative influence of the article 25 can be prevented, the conversion efficiency from the antenna electrical power Pin to the radiated electrical power Prad can be prevented from deteriorating, the impedance Z11 of the antenna element 23 or the tag main body 22 can be prevented from being changed by the article 25, the reflection property value S11 can be reduced, and the supply matching can be improved. In this manner, when the sheet member 20 or the auxiliary antenna 35 is used, the negative influence of the article 25 can be prevented, and a communication environment that secures a high gain can be realized.

Figure 17:
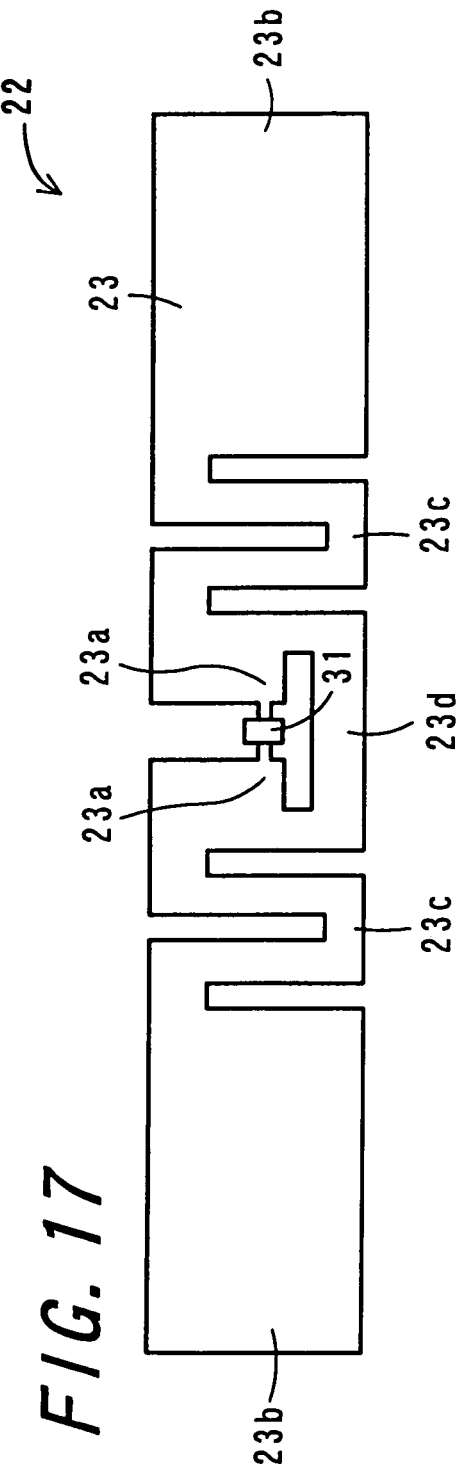
FIG. 17 is a plan view showing a tag main body 22 that can be applied to the tag 21 of the invention.

FIG. 17 is a plan view showing a tag main body 22 that can be applied to the tag 21 of the invention. As the tag main body 22, either a dipole antenna extending in a straight line or a tag main body 22 including a bent dipole antenna as shown in FIG. 17 may be used. The tag main body 22 is also a dipole antenna, and has a configuration in which a middle portion 23c meanders in an S-shape between a base end portion 23a that is connected to the IC 31 and a free end portion 23b, the free end portion 23b is in the shape of a plate that is wider than the middle portion 23c, and both side portions of the IC 31 are electrically connected via a loop portion 23d so as to bypass the IC 31. In the antenna element 23 shown in FIG. 17, the loop portion 23d is formed as the reactance loading portion. There are many radio-wave-type IC tags that partially have this loop portion. The tag main body 22 of FIG. 17 has a length of 94 mm and a width of 16 mm, and the loop portion has a length in the long axis direction of 12 mm.

Figure 18:
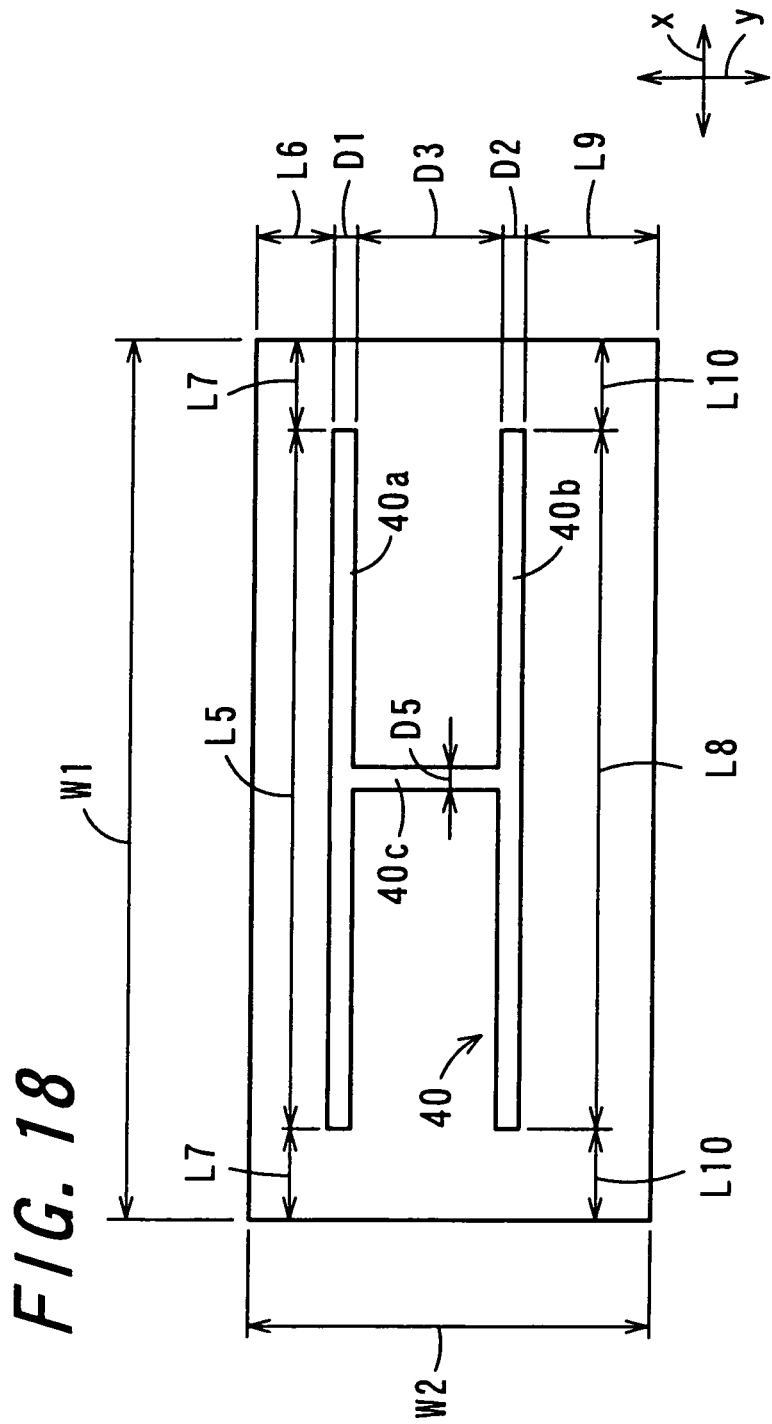
FIG. 18 is a plan view showing still another resonant layer 27 used for evaluating the performance of the tag 21.

FIG. 18 is a plan view showing still another resonant layer 27 used for evaluating the performance of the tag 21. The resonant layer 27 shown in FIG. 18 is in the shape of a rectangle, and an H-shaped discontinuous area 40 is formed therein. The first size W1 is 95 mm, and the second size W2 is 43 mm. The discontinuous area 40 is in the shape of an H having two elongated rectangular portions 40a and 40b that extend in the first direction x and are parallel to each other, and a connecting potion 40c that connects the rectangular portions 40a and 40b. The one rectangular portion 40a on one side in the second direction y has a width (size in the second direction y) D1 of 2 mm and a longitudinal size (size in the first direction x) L5 of 75 mm, and extends between the positions away respectively from both ends in the first direction x of the resonant layer 27 by a distance L7 of 10 mm in the inward direction, at a position away from an end on one side in the second direction y of the resonant layer 27 by a distance L6 of 8 mm in the inward direction. The other rectangular portion 40b on the other side in the second direction y has a width (size in the second direction y) D2 of 2 mm and a longitudinal size (size in the first direction x) L8 of 75 mm, and extends between the positions away respectively from both ends in the first direction x of the resonant layer 27 by a distance L10 of 10 mm in the inward direction, at a position away from an end on the other side in the second direction y of the resonant layer 27 by a distance L9 of 15 mm in the inward direction. The two rectangular portions 40a and 40b are away from each other in the second direction y by a spacing D3 of 16 mm. The connecting potion 40c extends in the second direction y at the central portion of the first direction x of the resonant layer 27, and has a width (size in the first direction x) D5 of 2 mm.

Figure 19:
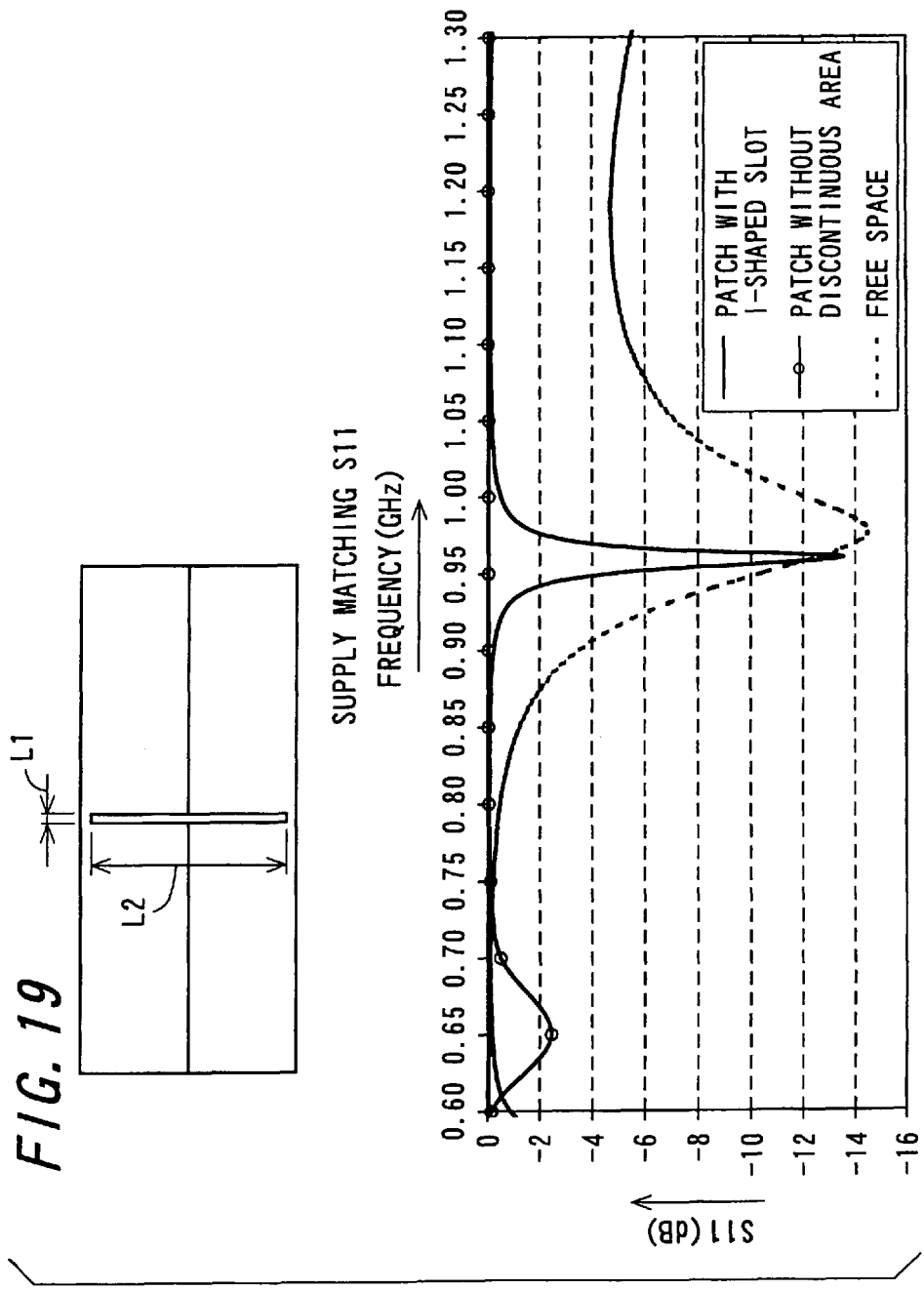
FIG. 19 is a graph showing the reflection property value S11 as a result of the evaluation of the tag 21 using the tag main body 22 shown in FIG. 17 and having the sheet member 20 shown in FIG. 8.
Figure 20:
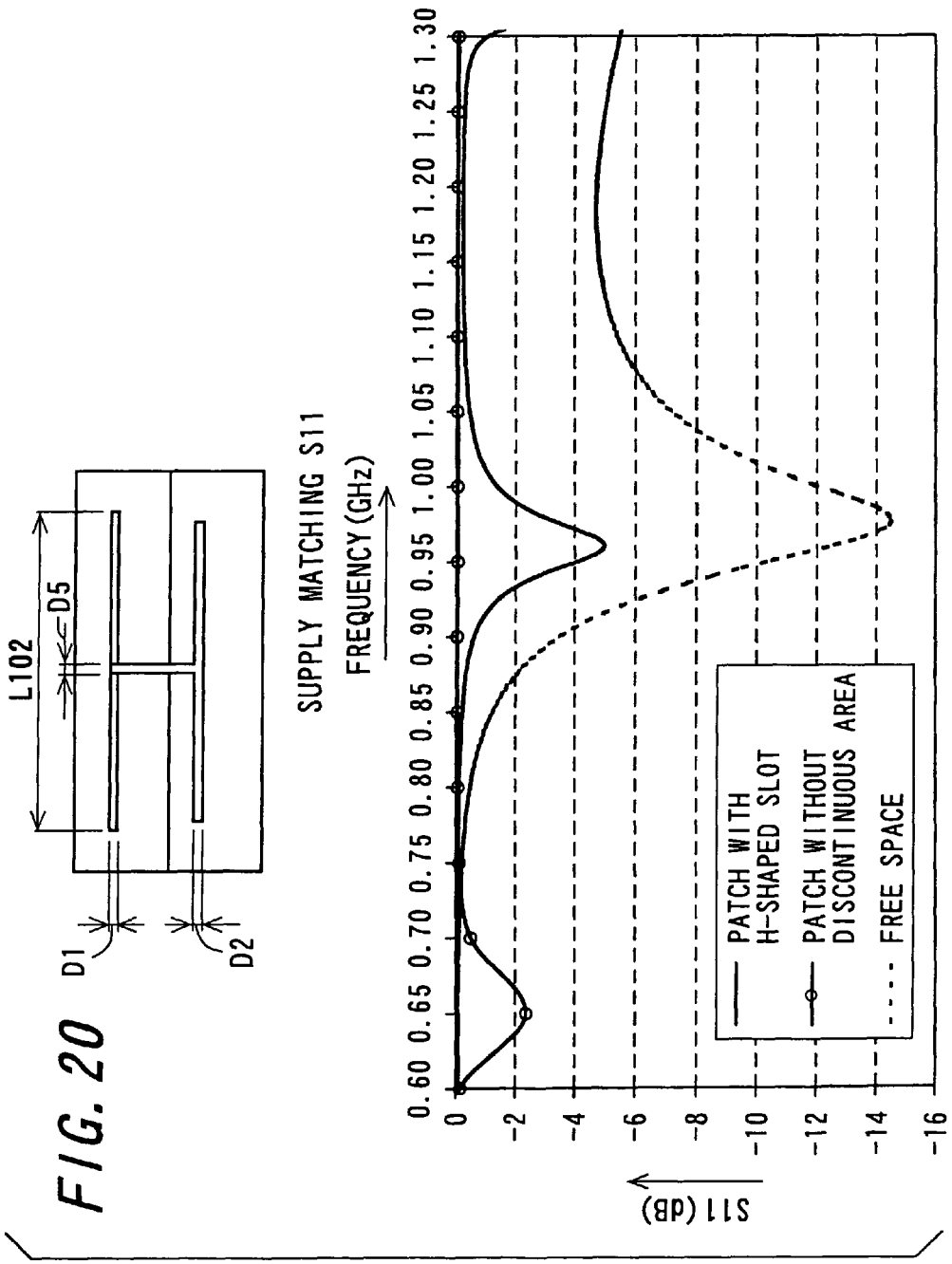
FIG. 20 is a graph showing the reflection property value S11 as a result of the evaluation of the tag 21 using the tag main body 22 shown in FIG. 17 and having the resonant layer 27 shown in FIG. 18.

FIG. 19 is a graph showing the reflection property value S11 as a result of the evaluation of the tag 21 using the tag main body 22 shown in FIG. 17 and having the sheet member 20 shown in FIG. 8. FIG. 20 is a graph showing the reflection property value S11 as a result of the evaluation of the tag 21 using the tag main body 22 shown in FIG. 17 and having the resonant layer 27 shown in FIG. 18. FIG. 21 shows graphs of the reflection property value S11 as results of the evaluation of the tag 21 using the tag main body 22 shown in FIG. 17 and having the resonant layer 27 shown in Examples 7 and 8. In the tag 21 showing the results in FIGS. 19 to 21, the first spacer layer 32 had a thickness of 1 mm, and the second spacer layer 33 had a thickness of 2 mm. The first spacer layer 32 and the spacer layer 33 were assumed to be made of resin foam. The real part of the relative permittivity in the first spacer layer 32 was set to 1.1, that in the second spacer layer 33 was set to 1.2, and the loss term of the permittivity tan δ (=∈"/∈') of these layers was set to 0.01. Here, these layers did not have magnetism. Furthermore, in the UHF band, the relative permittivity does not depend on the frequency and has a relatively stable value, and thus, this value may be applied to the entire UHF band. The material constants were measured using a network analyzer (manufactured by Agilent Technologies, Inc., product name HP8720ES) according to the coaxial line method.

In the resonant layer 27 used in the tag 21 showing the results in FIG. 19, the first size W1 was 110 mm, the second size W2 was 46 mm, the width L1 of the discontinuous area 40 was 1 mm, the length L2 was 42 mm, and the distance L3 was 2 mm. In the resonant layer 27 used in the tag 21 showing the results in FIG. 20, the size was as shown in FIG. 18. In the resonant layer 27 used in the tag 21 showing the results in FIG. 21, the first size W1 was 107 mm, and the second size W2 was 67 mm.

FIGS. 19 and 20 show comparisons between the case of free space and the case of the tag 21. In the case of the tag 21 showing the results in FIG. 19, the tag main body 22 extended in the first direction x, the IC 31 overlapped the discontinuous area 40, and the loop portion 23c crossed the discontinuous area 40. In the case of the tag 21 showing the results in FIG. 20, the tag main body 22 extended in the first direction x, the IC 31 overlapped the connecting potion 40c of the discontinuous area 40, and the loop portion 23c overlapped the rectangular portion 40b on the other side. In the case of the tag 21 showing the results in FIG. 21, the tag main body 22 extended in the first direction x.

In FIGS. 19 to 21, the horizontal axis indicates frequency, and the vertical axis indicates supply matching S11. Furthermore, in FIGS. 19 to 21, the results in free space are indicated by a dotted line, the results of the resonant layer having a patch structure with no discontinuous area are indicated by a combination of a line and circles, and the results for the tag 21 are indicated by a solid line. As shown in FIG. 21, in the case where the tag main body 22 having the loop portion 23d was used, the resonant layer 27 without the discontinuous area 40 did not obtain sufficient effect. However, as shown in Tables 2 and 3 and FIGS. 19 and 20, when the resonant layer 27 with the discontinuous area 40 was used, it was possible to improve the supply matching. In the case where the discontinuous area 40 was an elongated slit, the frequency band was narrowed, but it was possible to obtain extremely good supply matching at the communication frequency (953 MHz). When the communication distance was approximated using the approximating method as described above, results were obtained in which a communication distance of approximately 76% of that in the case of free space was obtained as shown in Example 4 in Table 3. Furthermore, in the case where the discontinuous area 40 was an H-shaped slot, the supply matching was slightly inferior to that in the case where the discontinuous area 40 was a rectangular slot, but, when the communication distance was approximated using the approximating method as described above, results were obtained in which a communication distance of slightly less than 60% of that in the case of free space was obtained. In this manner, in the case where the tag main body 22 having a reactance loading portion such as the loop portion 23d is used, a tag 21 with a long communication distance can be realized by using the resonant layer 27 in which the discontinuous area 40 is formed.

Figure 22:
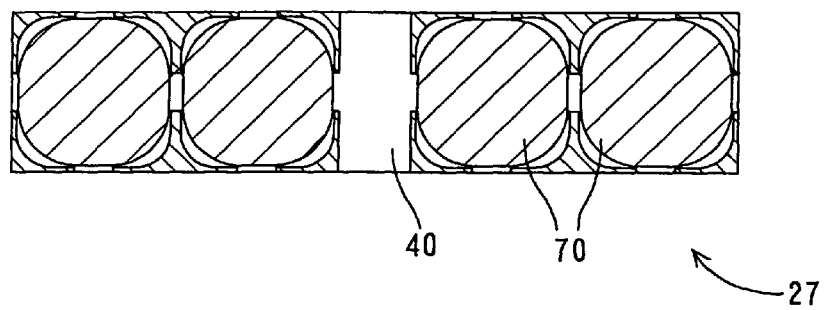
FIG. 22 is a plan view showing the resonant layer 27 according to another embodiment of the invention.

FIG. 22 is a plan view showing the resonant layer 27 according to another embodiment of the invention. For example, as shown in FIG. 22, the resonant layer 27 may have a plurality of conductor elements 70 that are electrically insulated from each other. In this configuration, each of the conductor elements 70 forms a patch antenna, a fractal antenna, or the like, and a similar effect can be achieved. Furthermore, as shown in FIG. 22, the resonant layer 27 may have an outline substantially in the shape of a polygon in which at least one corner (all corners in the example in FIG. 22) has a curved line. In the configuration in which a corner is curved in this manner, a tag 21 having excellent polarization properties can be realized in which reception can be stably performed without depending on the polarization direction of radio waves that arrive via the air. When the IC 31 and the reactance loading portion are arranged between the conductor elements 70, or in the insulating portion of the discontinuous area 40 disposed in the conductor elements 70, a similar effect can be obtained.

The auxiliary antenna includes a resonant layer made of a conductor layer and a second spacer, and may or may not include a conductive layer (reflecting layer) therebelow. The first spacer and the second spacer used in the examples are made of resin foam, the real part ∈' of the relative permittivity in a 950 MHz band is 1 to 2, and the dielectric tangent tan δ is 0.5 or less.

TABLE 1

| | Embodiment | Size a (mm) | Size b (mm) | Discontinuous area Length (mm) | Width (mm) | First Spacer Material | Thickness (mm) | Second Spacer Material | Thickness (mm) |
|---|---|---|---|---|---|---|---|---|---|
| Ex. 1 | A | 110 | 46 | L = 43 | 4 | Resin foam | 2 | Resin foam | 2 |
| Ex. 2 | A | 110 | 46 | L = 43 | 4 | Resin foam | 1 | Resin foam | 2 |
| Ex. 3 | B | 95 | 40 | L1 = 14 L2 = 65 | 4 | | 1 | | 3 |
| Comp. Ex. 1 | — | 110 | 46 | — | | Resin foam | 2 | Resin foam | 2 |
| Comp. Ex. 2 | — | | | Spacer material: Foam polystyrene | | | | | |
| Comp. Ex. 3 | — | | | Spacer material: Foam polystyrene | | | | | |

| | Presence of reflecting layer | Total thickness (mm) | Tag arrangement position (mm) | Communication distance (m) | Communication ratio (%) |
|---|---|---|---|---|---|
| Ex. 1 | Present | 4.2 | 33 | 5.2 | 116 |
| Ex. 2 | Present | 3.2 | 33 | 5.0 | 111 |
| Ex. 3 | Absent | 4.6 | 18 | 4.1 | 91 |
| Comp. Ex. 1 | Present | 4.2 | 33 | 0.2 | 4 |
| Comp. Ex. 2 | Spacer material: Foam polystyrene | 3 | — | 0.2 | 4 |
| Comp. Ex. 3 | Spacer material: Foam polystyrene | 5.5 | — | 0.6 | 13 |

EXAMPLES

A sheet member according to each embodiment of the above-described auxiliary antenna was produced, a wireless IC tag was stuck thereto, and the communication distance was measured.

Table 1 shows the sizes, materials, and the like in Examples 1 to 3 and Comparative Examples 1 to 3. In Table 1, a size a indicates the length of a long side of the sheet member, and a size b indicates the length of a short side of the sheet member. In Examples 1 and 2 (Embodiment A), the width of the discontinuous area indicates the width of an I-shaped slot. In Example 3 (Embodiment B), this width indicates the width of an H-shaped slot. Here, the slot S1 and the slots S2 have the same width. Furthermore, in the H-shaped slot, the length of the slot in the longitudinal direction is L1, and the length in the width direction is L2. The slot S1 and the slots S2 have the same width. All slots may have different lengths or different widths, but, here, the longer slots have the same length, and all slots have the same width.

Comparative Example 1 is the same as Example 1 except that no discontinuous area is formed. Comparative Examples 2 and 3 have a spacer consisting of one layer made of foam polystyrene, and do not have an auxiliary antenna or the like.

Figure 23:
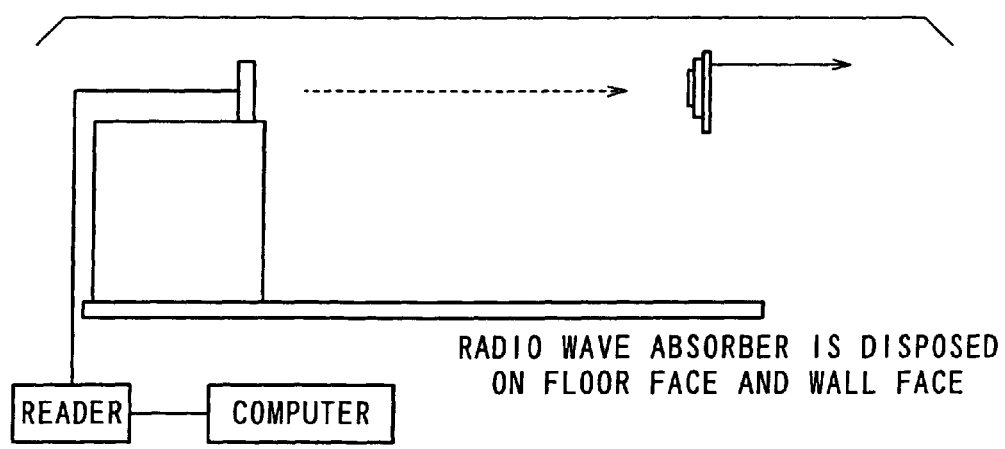
FIG. 23 is a schematic view showing a method for measuring the communication distance.

FIG. 23 is a schematic view showing a method for measuring the communication distance. The wireless IC tag that was stuck to the sheet member was disposed on a SUS plate (210 mm×300 mm×0.5 mm thickness), the SUS plate was gradually spaced away from the position at which the reader antenna set at a predetermined height was able to perform communication, and the maximum distance at which reading was possible was taken as the communication distance.

A wave tag manufactured by Omron Corporation was used as the wireless IC tag, a V750-HS01CA (a circular polarization patch antenna) manufactured by OMRON Corporation was used as the reader antenna, and a V750-BA50C04-JP (maximum transmission output 28.5 dBm, channel used: 1 CH) manufactured by OMRON Corporation was used as the reader. The wireless IC tag was disposed on the sheet member so that part of the IC chip and the reactance loading portion of the wireless IC tag faced the discontinuous area.

Based on the measured communication distance, the communication ratio was calculated for evaluation. The communication ratio was obtained by calculating (measured communication distance)/(reading communication distance of tag in free space (4.5 m))×100(%). Table 1 shows the results. The output of the reader was set to a high output (28.5 dBm).

In all Comparative Examples 1 to 3, the communication distance was short, and the communication ratio was 4 to 13%. In all Examples 1 to 3, the communication ratio was significantly larger than that of the Comparative Examples, and a communication-improving effect was observed.

The wireless communication-improving sheet member and the wireless IC tag of Example 3 that were stuck to each other were attached to a curved face of a φ140 mm metal can. Even in this state, the communication distance was 3.5 m, and the communication ratio was as high as 79%. Since this configuration did not have a reflecting layer, the flexibility of the sheet member was improved, and thus, application to the curved face of the metal article was possible. That is, a cylindrical metal product also can be managed through RFID wireless communication.

Tables 2 and 3 show the results obtained by simulating the effect of shape in the case where the wireless communication-improving sheet member 20 of the invention was used for the wireless IC tag. Table 2 shows shape and material conditions, and Table 3 shows supply matching S11 (S parameter), communication properties at 953 MHz, and the communication improvement ratio determined therefrom. Tables 2 and Table 3 show comparisons with the case in which a wireless IC tag 120 was used with no discontinuous area (with a patch antenna type configuration) and in free space.

TABLE 2

|  |  |  |  | Discontinuous area | | First spacer | | Second spacer | |
| --- | --- | --- | --- | --- | --- | --- | --- | --- | --- |
|  | Embodiment | Size a (mm) | Size b (mm) | Length (mm) | Width (mm) | Material | Thickness (mm) | Material | Thickness (mm) |
| Ex. 4 | A | 100 | 46 | L = 42 | 2 | Resin foam C | 1 | Resin foam C | 2 |
| Ex. 5 | B | 96 | 44 | L1 = 18 L2 = 76 | D5, D1, D2 = 2 | | 1 | | 2 |
| Ex. 6 | A | 110 | 46 | 43 | 4 | Resin foam A | 2 | Resin foam A | 2 |
| Ex. 7 | B | 104 | 30 | L1 = 24 L2 = 52 | D5 = 6 D1, D2 = 5 | | 1 | | 2 |
| Ex. 8 | B | 104 | 30 | L1 = 22 L2 = 52 | D5, D1, D2 = 6 | | 0.5 | | 1 |
| Ex. 9 | C | 95 | 30 | 27 | 6 | | 1 | Resin | 2 |
| Ex. 10 | C | 105 | 30 | 27 | 6 | | 1 | foam B | 3 |
| Ex. 11 | C | 105 | 30 | 27 | 6 | | 0.5 | | 2.5 |
| Ex. 12 | C | 105 | 40 | 30 | 6 | | 1 | | 3 |
| Comp. Ex. 4 | Patch without discontinuous area | 100 | 46 | None | — | Resin foam | 1 | Resin foam | 2 |
| Comp. Ex. 5 | Patch without discontinuous area | 96 | 44 | None | — | | 1 | | 2 |
| Comp. Ex. 6 | Free space | — | — | — | — | — | — | — | — |

|  |  | Coating material | | Presence of reflecting layer | Total thickness (mm) | Tag arrangement position (mm) |
| --- | --- | --- | --- | --- | --- | --- |
|  |  | Material | Thickness (mm) | | | |
| | Ex. 4 | None | — | Present | 3 | 23 |
| | Ex. 5 |  | — | Present | 3 | 23 |
| | Ex. 6 |  | — | Present | 4 | 31 |
| | Ex. 7 |  | — | Present | 3 | 23 |
| | Ex. 8 |  | — | Present | 1.5 | 23 |
| | Ex. 9 | PET | 0.85 | Present | 4.7 | 18 |
| | Ex. 10 |  | 0.5 | Present | 5 | 25 |
| | Ex. 11 |  | 0.5 | Present | 4 | 25 |
| | Ex. 12 |  | 0.75 | Present | 5.5 | 30 |
| | Comp. Ex. 4 | — | — | — | 3 | — |
| | Comp. Ex. 5 | — | — | — | 3 | — |
| | Comp. Ex. 6 | — | — | — | — | — |

\* Resin foam A: Real part εr' of relative permeability = 1.1, Dielectric tangent tanδ = 0.01 (950 MHz)
Resin foam B: Real part εr' of relative permeability = 1.2, Dielectric tangent tanδ = 0.01 (950 MHz)
Resin foam C: Real part εr' of relative permeability = 1.3, Dielectric tangent tanδ = 0.01 (950 MHz)
PET: Real part εr' of relative permeability = 3, Dielectric tangent tanδ = 0.01 (950 MHz)

TABLE 3

|  |  | Supply matching S11 | Communication properties (935 MHz) | | | |
| --- | --- | --- | --- | --- | --- | --- |
|  | Embodiment | Peak frequency (GHz) | Supply matching S11 (dB) | Absolute gain Ga (dBi) | Working gain Gw (dBi) | Communication improvement ratio |
| Ex. 4 | A | 0.96 | −7.30 | 0.00 | −0.90 | 75.7% |
| Ex. 5 | B | 0.965 | −4.52 | −1.87 | −3.76 | 54.4% |
| Ex. 6 | A | 0.96 | −7.17 | 0.110 | −0.82 | 76.4% |
| Ex. 7 | B | 0.955 | −5.28 | −1.85 | −3.38 | 56.1% |

TABLE 3-continued

| | | Supply matching S11 | | Communication properties (935 MHz) | | |
|---|---|---|---|---|---|---|
| | Embodiment | Peak frequency (GHz) | Supply matching S11 (dB) | Absolute gain Ga (dBi) | Working gain Gw(dBi) | Communication improvement ratio |
| Ex. 8 | B | 0.95 | −13.41 | −6.05 | −6.26 | 40.3% |
| Ex. 9 | C | 0.946 | −7.41 | −0.050 | −0.92 | 75.5% |
| Ex. 10 | C | 0.956 | −11.36 | 1.430 | 1.10 | 95.3% |
| Ex. 11 | C | 0.954 | −11.87 | 0.280 | −0.01 | 83.8% |
| Ex. 12 | C | 0.962 | −6.80 | 2.547 | 1.53 | 100.1% |
| Comp. Ex. 4 | Patch without discontinuous area | 0.65 | −2.45 | −9.63 | −13.29 | 18.2% |
| Comp. Ex. 5 | Patch without discontinuous area | 0.65 | −2.38 | −10.19 | −13.94 | 16.9% |
| Comp. Ex. 6 | Free space | 0.975 | −10.53 | 1.92 | 1.52 | 100.0% |

First, the wireless IC tag used for the calculation was disposed substantially in the longitudinal direction (length 94 mm, width 16 mm), was a UHF band-compliant IC tag in which the impedance of the IC chip matches in the 950 MHz band in free space. Here, the resin foam A had a real part $\in'$ of relative permittivity of 1.1 and a dielectric tangent tan δ of 0.01 in the 950 MHz band. The resin foam B had a real part $\in'$ of relative permittivity of 1.2 and a dielectric tangent tan δ of 0.01 in the same frequency band. The resin foam C had a real part $\in'$ of relative permittivity of 1.3 and a dielectric tangent tan δ of 0.01 in the same frequency band. The PET had a real part $\in'$ of relative permittivity of 3 and a dielectric tangent tan δ of 0.01 in the same frequency band.

Figure 24:
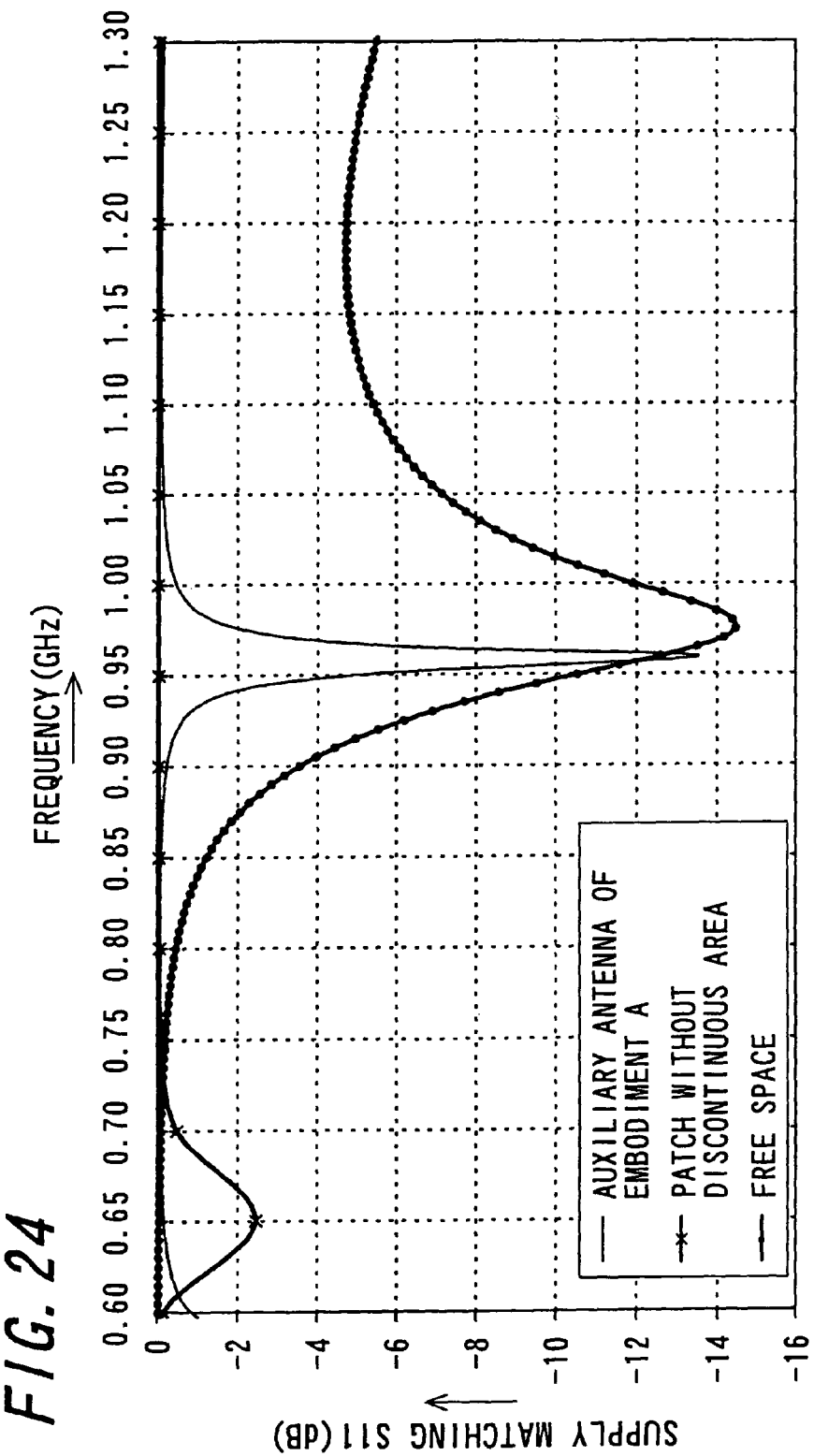
FIG. 24 is a graph showing a reflection property value S11 as the results of an evaluation of examples.
Figure 25:
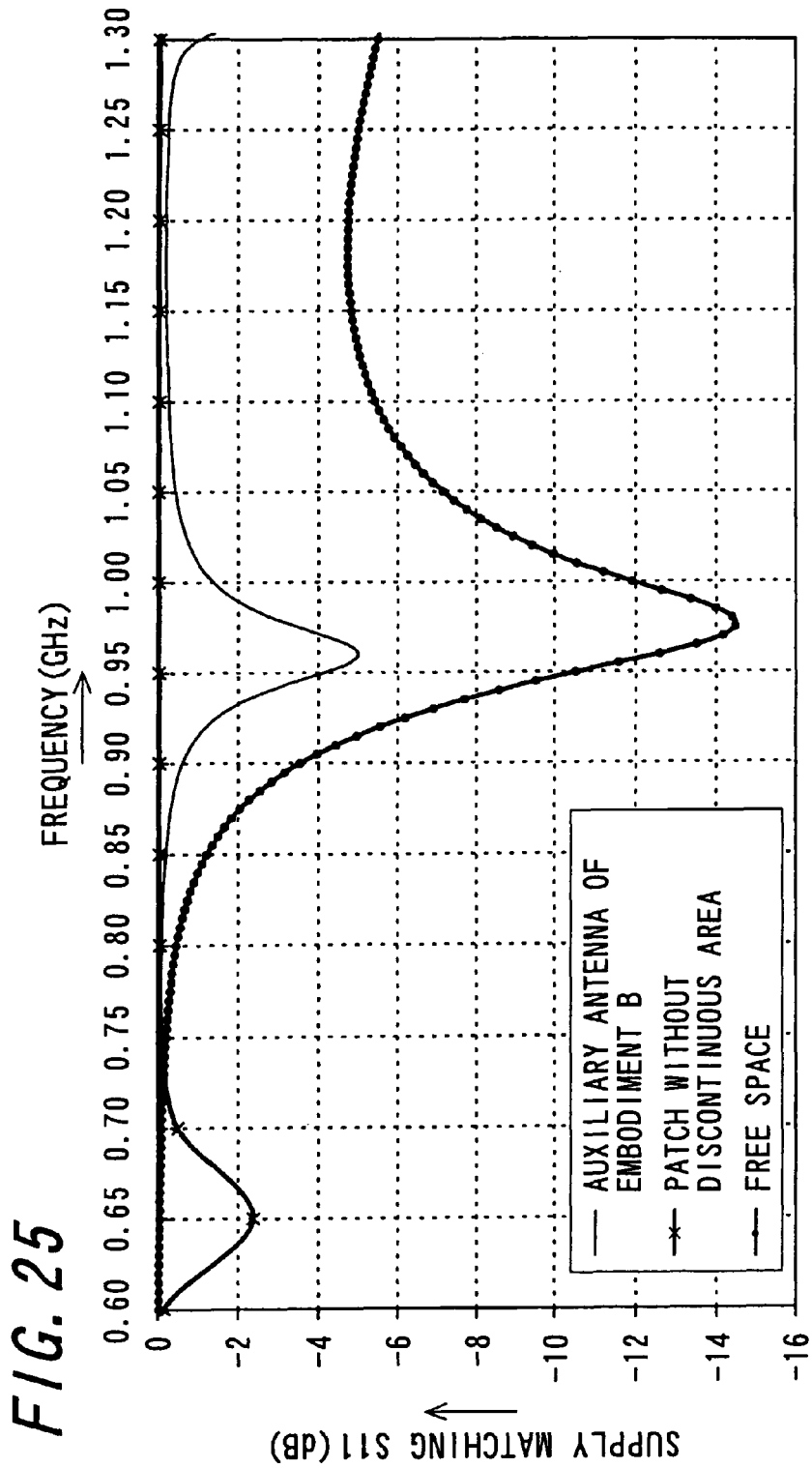
FIG. 25 is a graph showing the reflection property value S11 as the results of an evaluation of examples.

Table 3 shows the peak frequency (GHz) of the supply matching S11, the supply matching S11 (dB) indicating the reflection properties of electromagnetic waves at 953 MHz, the absolute gain Ga (dB) indicating gain with respect to a reference antenna defined to have no directionality and no loss at the same frequency, the working gain Gw expressed by Expression (1) obtained in consideration of both matching loss and the absolute gain Ga, and the communication improvement ratio expressed by Expression (2) indicating a change in the communication distance of the wireless IC tag 120 with respect to the communication distance in free space, under various conditions. Furthermore, FIGS. 21, 24, and 25 show the results for the supply matching S11. FIG. 21 shows comparisons between the results of Examples 7 and 8 and those in free space. FIG. 24 shows comparisons between the results of Example 4 (the auxiliary antenna in Embodiment A) and those in a patch structure with no discontinuous area and free space. Moreover, FIG. 25 shows comparisons between the results of Example 5 (the auxiliary antenna in Embodiment B) and those in a patch structure with no discontinuous area and free space. Here, the absolute gain Ga shows a measurement unit indicating the degree of a difference in the density of electrical power radiated from the antenna when the same electrical power is supplied.

$$Gw = 10\log\left(1 - 10^{\frac{S11}{10}}\right) + Ga \quad (1)$$

$$\text{Communication improvement ratio} = \sqrt{10^{\frac{Gw - Gwfree}{10}}} \quad (2)$$

wherein Gwfree indicates Gw value in free space (Comparative Example 6)

In order to increase the communication improvement ratio, it is necessary to realize impedance matching thereby making the supply matching S11 as small as possible, and to increase the absolute gain Ga. The sheet member 20 was thin and small, but it was possible to perform impedance matching with the wireless IC tag and to increase the antenna radiation properties (the absolute gain Ga) by simply tackinessly or adhesively applying this sheet member 20. Although the band viewed with regard to the supply matching S11 was still narrow, communication improvement ratios close to that in free space were observed. Furthermore, as seen from the results shown in FIGS. 21, 24, and 25, it was confirmed that the communication-improving effect of the discontinuous area disposed in the resonant layer was large. That is to say, a sheet member 101 that covers a possible communication band and has a high communication improvement ratio can be provided by further examining the material or the configuration.

Table 4 shows the sizes, materials, and the like in Examples 13 to 18 and Comparative Examples 7 to 12. The shape of the discontinuous area 40 shown in Table 4 was an H-shaped slot, and this configuration is referred to as Embodiment B. The length and the width of the discontinuous area 40 indicate the length and the width of the H-shaped slot.

TABLE 4

| | | | | Discontinuous area | | First spacer | | Second spacer | | Presence of | Total |
|---|---|---|---|---|---|---|---|---|---|---|---|
| | Embodiment | Size a (mm) | Size b (mm) | Length (mm) | Width (mm) | Material | Thickness (mm) | Material | Thickness (mm) | reflecting layer | thickness (mm) |
| Comp. Ex. 7 | B | 95 | 35 | 85 | 4 | Resin foam | 1 | Resin foam | 1 | Absent | 2.2 |
| Ex. 13 | | 95 | 35 | 80 | 6 | | 1 | | 1.5 | Absent | 2.7 |
| Ex. 14 | | 95 | 35 | 85 | 6 | | 0.5 | | 1 | Absent | 1.7 |
| Comp. Ex. 8 | | 115 | 25 | 85 | 6 | | 1 | | 1 | Absent | 2.2 |
| Ex. 15 | | 95 | 35 | 65 | 6 | | 1 | | 2 | Absent | 3.2 |

TABLE 4-continued

| | | | | | | | | | |
|---|---|---|---|---|---|---|---|---|---|
| Comp. Ex. 9 | 105 | 35 | 75 | 2 | | 1 | | 1 | Absent | 2.2 |
| Comp. Ex. 10 | 95 | 25 | 75 | 6 | | 2 | | 2 | Absent | 4.2 |
| Ex. 16 | 95 | 25 | 65 | 4 | | 1 | | 1 | Absent | 2.2 |
| Comp. Ex. 11 | 95 | 35 | 85 | 6 | | 1.5 | | 1 | Absent | 2.7 |
| Ex. 17 | 70 | 40 | 45 | 5 | | 1 | | 1.5 | Absent | 2.7 |
| Comp. Ex. 12 | 95 | 35 | 80 | 2 | | 1 | EVA | 0.45 | Absent | 1.65 |
| Ex. 18 | 95 | 25 | 75 | 6 | EVA | 0.45 | Resin foam | 1 | Absent | 1.65 |

| | Tag arrangement position (mm) | Communication distance (m) | Communication ratio (%) | Coating material | Total thickness (mm) | Communication distance (m) | Communication ratio (%) |
|---|---|---|---|---|---|---|---|
| Comp. Ex. 7 | 28 | 0.62 | 14 | None | — | — | — |
| Ex. 13 | 23 | 2.58 | 57 | EVA 0.4 mmt | 3.5 | 3.14 | 70 |
| Ex. 14 | 20 | 1.9 | 42 | None | — | — | — |
| Comp. Ex. 8 | 18 | 0.62 | 14 | | — | — | — |
| Ex. 15 | 23 | 2.88 | 64 | | — | — | — |
| Comp. Ex. 9 | 23 | 0.32 | 7 | | — | — | — |
| Comp. Ex. 10 | 20 | 0.38 | 8 | | — | — | — |
| Ex. 16 | 18 | 2.22 | 49 | | — | — | — |
| Comp. Ex. 11 | 23 | 1.28 | 28 | EVA 0.4 mmt | 3.5 | 1.32 | 29 |
| Ex. 17 | 23 | 1.69 | 65 | | 3.5 | 1.94 | 75 |
| Comp. Ex. 12 | 18/23/28 | 0 | 0 | | 2.5 | 0.00 | 0 |
| Ex. 18 | 23 | 1.3 | 29 | | 2.5 | 2.24 | 50 |

The wireless IC tag, the reader antenna, and the reader were as in Example 1. At that time, the position was set so as to face the IC chip and the reactance loading portion of the wireless IC tag. Moreover, while keeping this state, the position of the wireless IC tag was relatively changed with respect to the sheet member, and the influence of the arrangement position was confirmed. When the wireless IC tag is disposed on the sheet member so that the long axis directions thereof are parallel to each other, and one side of the sheet member is taken as an upper end, the tag arrangement position in Table 4 refers to the distance (mm) from the upper end position to the lower end portion of an antenna element portion of the wireless IC tag. At that time, the IC chip of the wireless IC tag is disposed so as to be positioned at the discontinuous area of the sheet member or the auxiliary antenna.

In Embodiment B having a discontinuous area in the shape of an H-shaped slot, the communication distance tended to increase even when the thickness was reduced. The reason for this is that the slot portion could contribute not only to exchanging electromagnetic energy with the IC tag but also to transmitting and receiving radio waves. In this manner, the discontinuous area was able to function not only as a coupling area that realizes an intensive electromagnetic coupling between the IC chip and the sheet member (auxiliary antenna), but also as an antenna that receives or radiates radio waves. Furthermore, the resonant layer can be made smaller by adjusting the shape of the slot portion.

Furthermore, when the sheet member 20 on which the IC tag was disposed was coated with a coating material, the permittivity of the coating material could affect the antenna resonant frequency, and thus, it was found that the configuration of the coating material, such as the type or the thickness, has the effect of adjusting the wireless communication distance.

Although it was clearly seen from the communication distance and the communication ratio that the position at which the IC tag was disposed affects the communication-improving results, the optimum arrangement position changed according to the total thickness of the sheet member, and a clear tendency was not observed. However, it was found that, when the tag arrangement position is controlled, impedance matching can be properly adjusted, which leads to an improvement in communication. It was confirmed that, when the sheet member is simply disposed without a wired connection, the wireless IC tag can sufficiently transfer signals, and communication can be improved even when a communication-jamming member is present nearby.

Unlike the other examples, Example 17 is an example using a Rafsec UHF web tag (size: 30 mm×50 mm) manufactured by UPM. The sheet member had a size of not greater than 70 mm×40 mm, and can be used as a card-sized sheet member. This tag had a communication distance of 2.6 m in free space.

The communication distance and the communication ratio are shown in the case where the sheet member was used without any treatment and the case in which a sheet member coated with an EVA resin was used. As a result, it was found that a coating material affects the communication distance. Then, when only the coating material of the sheet member 20 was changed to a polyester elastomer (0.4 mm thickness) while the same wireless IC tag and the same sheet member 20 were used, the communication distance was shortened to 1.2 m. While the material constants of an EVA resin at 953 MHz were low, that is, the real part ($\in'$) of the complex relative permittivity was 2.4, the imaginary part ($\in''$) thereof was 0.02, and the dielectric tangent tan δ ($=\in''/\in'$) was 0.01, those of a polyester elastomer at 953 MHz were such that the real part ($\in'$) of the complex relative permittivity was 3.1, the imaginary part ($\in''$) thereof was 0.22, and the dielectric tangent tan δ was 0.07. The real part of the permittivity was slightly high, but the imaginary part thereof was high, and thus, an increase in energy loss caused thereby seemed to lead to a shorter communication distance. It is preferable to select a material having a dielectric tangent tan δ of 0.05 or less at the communication frequency. This aspect is applied not only to the coating material but also to the material of the spacer layers.

Table 5 shows the sizes, materials, and the like in Examples 19 to 27 and Comparative Examples 13 to 15. The shape of the discontinuous area shown in Table 5 was an I-shaped slit, and this configuration is referred to as Embodiment C. The length and the width of the discontinuous area indicate the length and the width of the I-shaped slit.

IC tag. Moreover, while keeping this state, the position of the wireless IC tag was relatively changed with respect to the sheet member, and the influence of the arrangement position was confirmed. It was found that, when the position is changed in this manner, the communication distance may vary, and the impedance matching can be adjusted.

Table 6 shows the sizes, materials, and the like in Examples 28 to 31 and Comparative Examples 16 and 17. The shape of the discontinuous area 40 shown in Table 6 is an I-shaped slot,

TABLE 5

|  | Embodiment | Size a (mm) | Size b (mm) | Discontinuous area | | First spacer | | Second spacer | | Coating material | |
|---|---|---|---|---|---|---|---|---|---|---|---|
|  |  |  |  | Length (mm) | Width (mm) | Material | Thickness (mm) | Material | Thickness (mm) | Material | Thickness (mm) |
| Comp. Ex. 13 | C | 100 | 35 | 25 | 6 | Resin foam | 1.5 | Resin foam | 2 | PET | 0.75 |
| Comp. Ex. 14 |  | 100 | 35 | 25 | 6 |  | 1.5 |  | 2 |  | 0.75 |
| Comp. Ex. 15 |  | 100 | 35 | 25 | 6 |  | 1.5 |  | 2 |  | 0.75 |
| Ex. 19 |  | 105 | 35 | 27 | 6 |  | 1 |  | 2 |  | 0.75 |
| Ex. 20 |  | 105 | 35 | 27 | 6 |  | 1 |  | 2 |  | 0.75 |
| Ex. 21 |  | 105 | 35 | 27 | 6 |  | 1 |  | 2 |  | 0.75 |
| Ex. 22 |  | 95 | 30 | 27 | 6 |  | 1.5 |  | 2 |  | 0.75 |
| Ex. 23 |  | 105 | 30 | 27 | 6 |  | 1 |  | 3 |  | 0.5 |
| Ex. 24 |  | 105 | 30 | 27 | 6 |  | 1 |  | 3 | EVA | 0.4 |
| Ex. 25 |  | 105 | 30 | 27 | 6 |  | 1 |  | 3 | None |  |
| Ex. 26 |  | 105 | 30 | 27 | 6 |  | 0.5 |  | 2.5 | PET | 0.5 |
| Ex. 27 |  | 105 | 40 | 30 | 6 |  | 1 |  | 3 |  | 0.75 |

|  | Presence of reflecting layer | Total thickness (mm) | Tag arrangement position (mm) | Communication distance (m) | Communication ratio (%) |
|---|---|---|---|---|---|
| Comp. Ex. 13 | Present | 5 | 22 | 0.6 | 13 |
| Comp. Ex. 14 | Present | 5 | 27 | 1.2 | 27 |
| Comp. Ex. 15 | Present | 5 | 32 | 1.35 | 30 |
| Ex. 19 | Present | 5 | 22 | 2.9 | 64 |
| Ex. 20 | Present | 5 | 27 | 3.9 | 87 |
| Ex. 21 | Present | 5 | 32 | 4.4 | 98 |
| Ex. 22 | Present | 5 | 18 | 4.4 | 99 |
| Ex. 23 | Present | 5 | 28 | 5.2 | 116 |
| Ex. 24 | Absent | 4.8 | 28 | 5.5 | 123 |
| Ex. 25 | Absent | 4 | 28 | 3.8 | 85 |
| Ex. 26 | Present | 4 | 28 | 5.1 | 113 |
| Ex. 27 | Present | 5.5 | 38 | 5.7 | 127 |

The wireless IC tag, the reader antenna, and the reader were as in Example 1. At that time, the position was set so as to face the IC chip and the reactance loading portion of the wireless and this configuration is referred to as Embodiment A. The length and the width of the discontinuous area 40 indicate the length and the width of the I-shaped slot.

TABLE 6

|  | Embodiment | Size a (mm) | Size b (mm) | Discontinuous area | | First spacer | | Second spacer | |
|---|---|---|---|---|---|---|---|---|---|
|  |  |  |  | Length (mm) | Width (mm) | Material | Thickness (mm) | Material | Thickness (mm) |
| Ex. 28 | A | 110 | 46 | 43 | 4 | Resin foam | 2 | Resin foam | 2 |
| Ex. 29 |  | 110 | 46 | 43 | 4 |  | 2 |  | 2 |
| Comp. Ex. 16 |  | 110 | 46 | 43 | 4 |  | 2 |  | 2 |
| Ex. 30 |  | 110 | 46 | 43 | 4 |  | 1 |  | 2 |
| Ex. 31 |  | 110 | 46 | 43 | 4 |  | 1 |  | 2 |

TABLE 6-continued

| Comp. Ex. 17 | | 110 | 46 | 43 | 4 | 1 | 2 |
|---|---|---|---|---|---|---|---|

| | Presence of reflecting layer | Total thickness (mm) | Tag arrangement position (mm) | Communication distance (m) | Communication ratio (%) |
|---|---|---|---|---|---|
| Ex. 28 | Present | 4.2 | 21 | 5.0 | 111 |
| Ex. 29 | Present | 4.2 | 33 | 3.4 | 76 |
| Comp. Ex. 16 | Present | 4.2 | 45 | 1.0 | 22 |
| Ex. 30 | Present | 3.2 | 21 | 2.0 | 44 |
| Ex. 31 | Present | 3.2 | 33 | 5.0 | 111 |
| Comp. Ex. 17 | Present | 3.2 | 45 | 1.0 | 22 |

The wireless IC tag, the reader antenna, and the reader were as in Example 1. At that time, the position was set so as to face the IC chip and the reactance loading portion of the wireless IC tag. The tag arrangement position was as in the foregoing examples.

As a result, it was confirmed that, regardless of whether or not a coating material is used, when the wireless IC tag and the sheet member are simply arranged without a wired connection, the wireless IC tag can sufficiently transfer signals, and communication can be improved even when a communication-jamming member is present nearby.

Table 7 shows the sizes, materials, and the like in Examples 32 to 34. The shape of the discontinuous area shown in Table 7 was a patterned shape as shown in FIG. 22, and this configuration is referred to as Embodiment K. The width of the discontinuous area indicates the spacing between the pattern elements. Furthermore, the length of the discontinuous area indicates the width of the sheet member in this example.

relative permittivity was 19.0, the imaginary part ($\in''$) thereof was 0.9, the real part (W) of the complex relative permeability was 5.3, and the imaginary part ($\in''$) thereof was 1.4. The permeability tangent tan δ was 0.27, but the dielectric tangent tan δ was suppressed so as to be as low as 0.05. With a combination of the pattern elements and the magnetic material layer, it was possible to obtain a communication-improving effect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The foregoing embodiments are merely examples of the invention, and it is possible to modify the configuration. For

TABLE 7

| | | Discontinuous area | | | First spacer | | Second spacer | |
|---|---|---|---|---|---|---|---|---|
| | Embodiment | Size a (mm) | Size b (mm) | Length (mm) | Width (mm) | Material | Thickness (mm) | Material | Thickness (mm) |
| Ex. 32 | K | 120 | 27 | 27 | 12 | Magnetic | 2 | Resin | 2 |
| Ex. 33 | | 120 | 27 | 27 | 12 | substance | 2 | | 2 |
| Ex. 34 | | 120 | 27 | 27 | 12 | layer | 2 | | 2 |

| | Presence of reflecting layer | Total thickness (mm) | Tag arrangement position (mm) | Communication distance (m) | Communication ratio (%) |
|---|---|---|---|---|---|
| Ex. 32 | Present | 4.2 | 22 | 2.3 | 51 |
| Ex. 33 | Present | 4.2 | 26 | 2.2 | 49 |
| Ex. 34 | Absent | 4.2 | 22 | 3.4 | 76 |

In Embodiment K having a discontinuous area in the form of a spacing between pattern elements or the like, the pattern elements 70 that were small antennas respectively exchanged electromagnetic energy with the IC tag, and improved communication near a communication-jamming member. Furthermore, when a plurality of small pattern elements 70 were shaped into circles or the corner portions were curved, the radio-wave polarization dependence was reduced. Thus, for example, even when the IC tag and the sheet member were warped, it was possible to improve the communication ability for radio waves with any polarization.

In this embodiment, a magnetic material layer was used. The magnetic material layer was formed by kneading 50 vol. % of carbonyl iron particles with PVC, the material constants at 950 MHz were such that the real part ($\in'$) of the complex example, the sheet member 20 or the auxiliary antenna 35 may not include the reflecting layer 28. In this case, the spacer layer 33 is attached to the article 25. Also in this sort of configuration, the resonant layer 27 and the surface of the article 25 form an auxiliary antenna, and a similar effect is obtained. Furthermore, although examples were shown in which the communication frequency was 953 MHz, there is no limitation to this, and the communication frequency may be adjusted to any frequency. Furthermore, the resonant frequency does not have to fully match the communication frequency, and, for example, in the case where the frequency is adjusted to a US band (911 to 926 MHz) of the UHF band frequency, communication also may be performed in an EU band (868 to 870 MHz) or a JP band (952 to 956 MHz). Here, as the reader in the foregoing examples, a high output reader as defined in the Japanese Radio Act was used. The standard is such that the antenna power is 1 W or less, and the antenna gain is 6 dBi or less. As the output of this reader is increased, the communication distance is increased, but the standard for the output of the reader varies from country to country. For example, in this specification, even a configuration that was stated as a comparative example because a reader as defined in the Japanese domestic standard was used may be encompassed by the scope of an example in which communication is possible because the communication distance is increased when a high output reader can be used.

The invention defines a mechanism for improving communication using a wireless communication-improving sheet member and an auxiliary antenna. According to this gist, a thinner and higher performance wireless communication-improving sheet member in the case where the output of the reader is increased to be higher than the Japanese domestic standard is naturally encompassed by the scope of the invention even in the case where that sheet member was stated as a comparative example in this specification.

Figure 26:
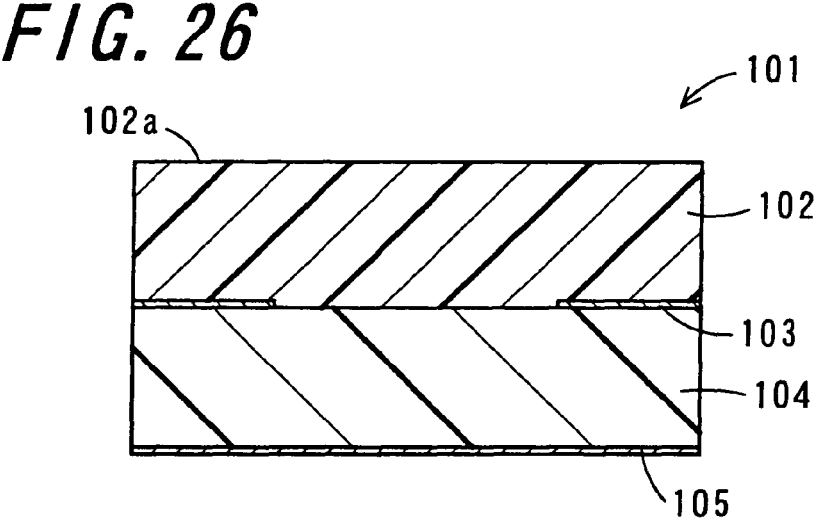
FIG. 26 is an enlarged cross-sectional view of a sheet member 101 according to another embodiment of the invention.

FIG. 26 is an enlarged cross-sectional view of a sheet member 101 according to another embodiment of the invention. In the foregoing embodiments, configurations were described in which the discontinuous area 40 having a bottom defined by the second spacer is disposed through the first spacer 102, having an arrangement face 102a, and the auxiliary antenna, but a configuration is also possible in which no opening is disposed through a first spacer 102, and an opening is disposed only through an auxiliary antenna 103.

The manufacturing method of this embodiment may be a method in which a first spacer 102 having no opening is stuck to the auxiliary antenna 103 having an opening, or may be a method in which, after an opening is disposed through the first spacer 102 and the auxiliary antenna 103, the opening of the first spacer 102 is filled up.

Figure 27A:
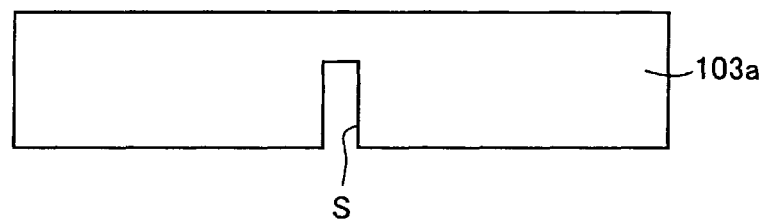
FIG. 27A is a plan view of another example of the auxiliary antenna.
Figure 27B:
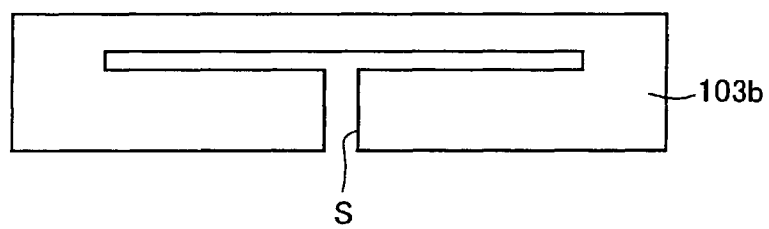
FIG. 27B is a plan view of another example of the auxiliary antenna.

In the foregoing embodiment, a groove-like opening was disposed through the auxiliary antenna 103, but a cutout also may be disposed. FIG. 27 shows plan views of other examples of the auxiliary antenna. FIG. 27A shows an auxiliary antenna 103a in which a cutout S in the shape of a straight line is formed. FIG. 27B shows an auxiliary antenna 103b in which a cutout in the shape of a straight line parallel to the short side direction and an opening in the shape of a groove parallel to the long side direction intersect each other at the center portion, and the cutout in the shape of a straight line does not project out of the opening.

Figure 28A:
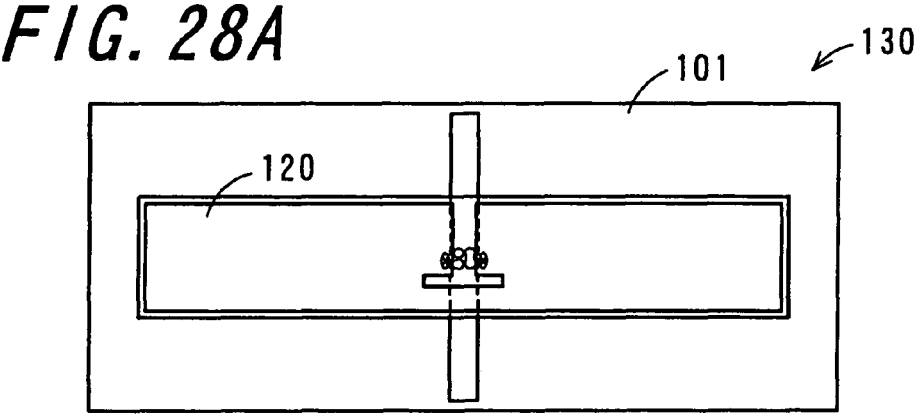
FIG. 28A is a plan view of an IC tag 130 for wireless communication according to still another embodiment of the invention.
Figure 28B:
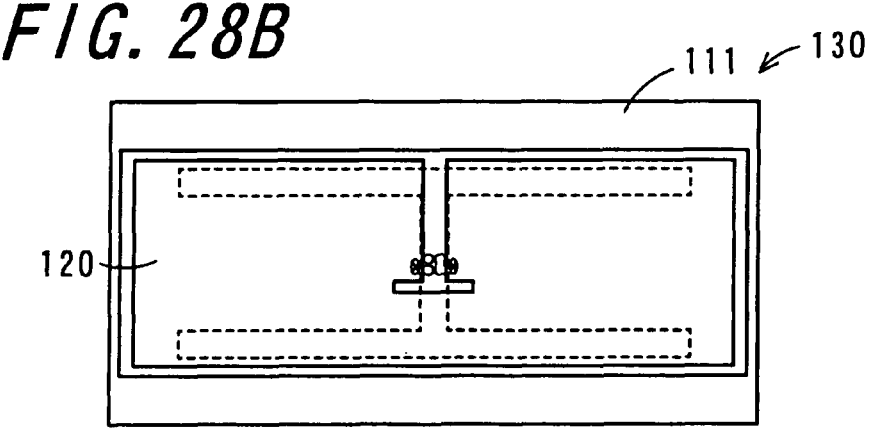
FIG. 28B is a plan view of an IC tag 130 for wireless communication according to still another embodiment of the invention.

FIG. 28 shows plan views of an IC tag 130 for wireless communication according to still another embodiment of the invention. The IC tag 130 for wireless communication of the embodiment is characterized in that the wireless IC tag 120 is mounted on the arrangement face of the sheet member 101. FIG. 28A shows a configuration in which the wireless IC tag 120 is mounted on the arrangement face of a sheet member 101 having an I-shaped slot. FIG. 28B shows an embodiment in which the wireless IC tag 120 is mounted on the arrangement face of a sheet member 101 having an H-shaped slot.

Furthermore, at least one surface portion of the sheet member 20 may be tacky or adhesive. This tackiness or adhesiveness may be used to stick the sheet member 20 or the auxiliary antenna 35 to the tag main body 22. Furthermore, this tackiness or adhesiveness may be used to attach the tag 21 to the article 25. The fixing method is not limited to these, and any method can be used. The method for attachment may be a method using a fixing tool, such as screws, a method using a magnet, a fitting method, a pressing method using a tape or the like, a method using a hook-and-loop fastener, or the like. In the case of a configuration in which the tag 21 is held between hard covers or the like, the tag main body 22, the sheet member 20 or the auxiliary antenna 35, and the like do not have to individually have tackiness or adhesiveness.

Furthermore, the sheet member 20 or the auxiliary antenna 35 may be configured with flame-resistant, semi-incombustible, or incombustible properties. For example, a flame retardant or an auxiliary flame retardant may be added to the spacer layers 32, 33 or the like. Furthermore, at least part of the outer periphery of the sheet member 20 or the auxiliary antenna 35 can be covered with a material that is flame-resistant or incombustible. For example, also in the case of electronics apparatuses such as portable telephones, the internal polymer material may be required to be flame-resistant.

Part or the whole of the outer surface of the IC tag 21 for wireless communication is preferably coated with a dielectric material. Examples of the coating dielectric material include those for hard covers and those for soft covers providing flexibility. Examples of a hard cover may include the various types of plastic, inorganic materials, wood, and the like described above. Resin mixed with an inorganic material or the like also may be used. Examples of a soft cover include the thermoplastic elastomers and various synthetic rubbers described above. A material that can provide rigidity is used to form a hard cover and a material that can provide flexibility is used to form a soft cover. Examples of a material that can be used include not only materials shown as an example of the dielectric material, but also an inorganic material, a paper-based material, a wood-based material, a clay-based material, a glass-based material, a ceramic-based material, and the like. Optionally, a filler may be added to these materials, or a crosslinking treatment may be performed. Furthermore, these materials may have tackiness or adhesiveness. Also, a foamed material may be used.

Furthermore, the sheet member 20 or the auxiliary antenna 35 may be heat-resistant. Specifically, the sheet member 10 can resist a temperature up to 150° C. in a case where a crosslinking agent is added to a rubber or resin material. The properties of the sheet member 20 or the auxiliary antenna 35 do not change at least to a temperature exceeding 150° C. Regarding heat resistance, resistance against a temperature of 150° C. or higher can be provided also by coating at least part of a tag 54, the sheet member 20, the antenna element 23, and an IC chip 31 with ceramics or a heat resisting resin (for example, a polyphenylene sulfide resin to which $SiO_2$ fillers have been added). In the case of ceramics coating, complete sintering or partial sintering may be performed, or sintering may not be performed.

Figure 29:
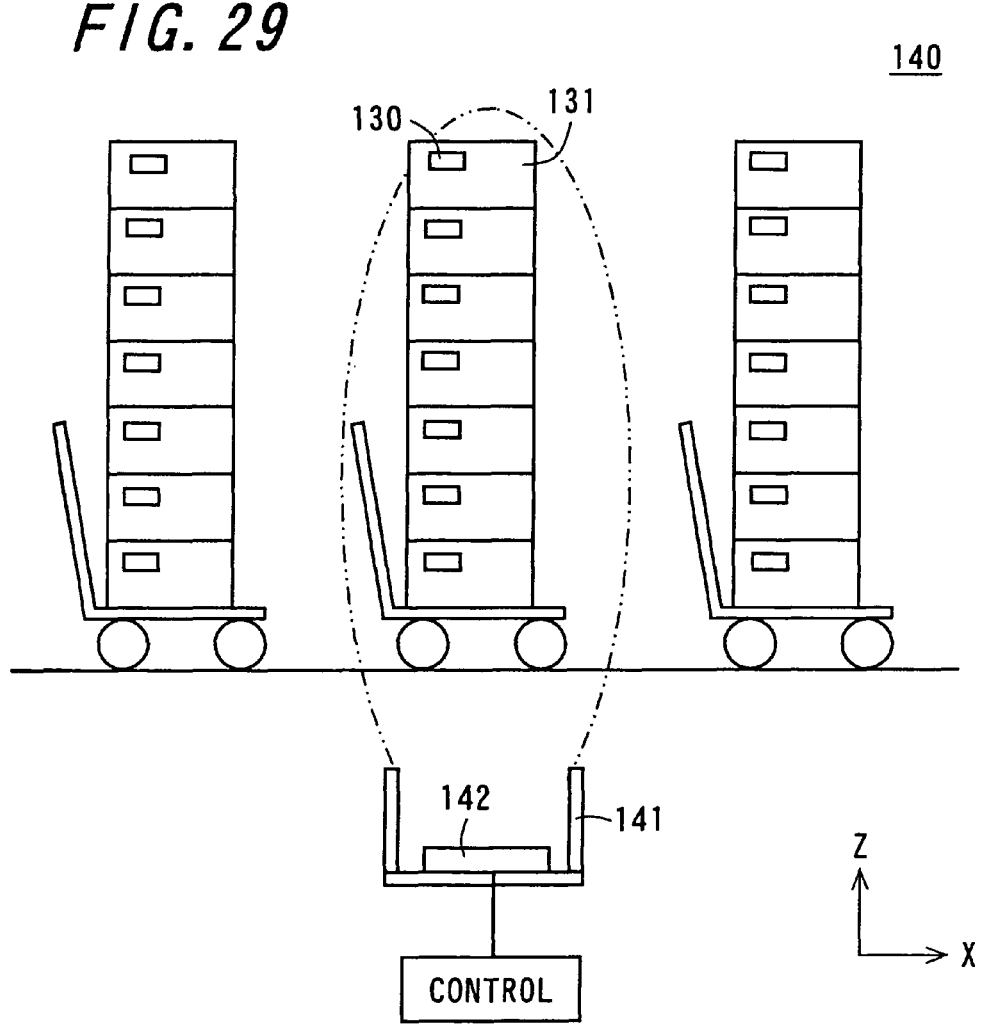
FIG. 29 is a plan view showing a wireless communication system 40 according to still another embodiment of the invention.
Figure 30:
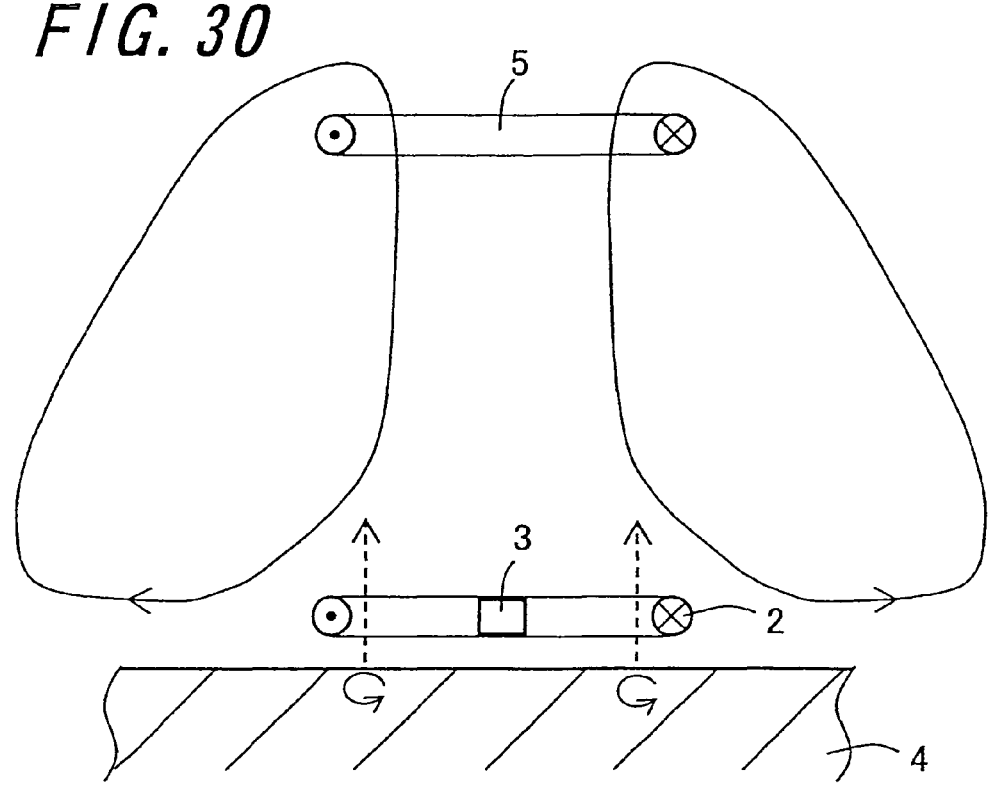
FIG. 30 is a cross-sectional view schematically showing an IC tag 1 according to a conventional technique.
Figure 31:
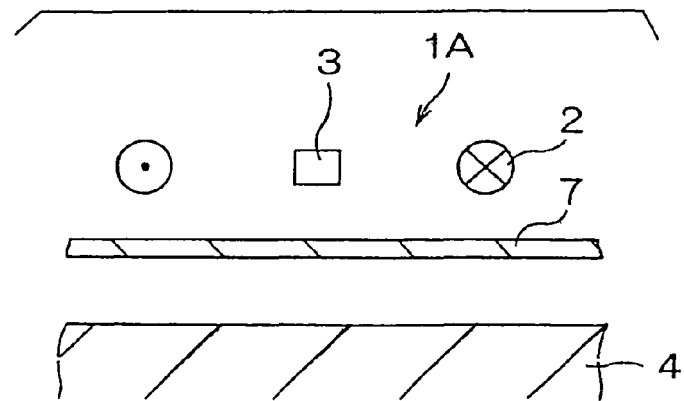
FIG. 31 is a cross-sectional view schematically showing an IC tag 1A according to another conventional technique.

Still another embodiment of the invention involves a wireless communication system. Examples of the wireless communication system include an RFID wireless communication system 140 as shown in FIG. 29, in which, for example, a wireless IC tag 130 is stuck to each of a plurality of metal containers 131, the metal containers 131 are simultaneously passed through an antenna gate portion 141 at which a reader 142 is disposed, and information is read or written. Furthermore, it is also possible to configure an RFID wireless communication system in which a wireless IC tag 130 is stuck to each of a large number of metal articles, and the metal articles are sequentially transported on a conveyer (with a constant spacing interposed therebetween), and subjected to logistics management (incoming/outgoing management), traceability management, and the like at an antenna gate portion disposed at any position.

The sheet member 20 or the auxiliary antenna 35 of the invention can be used to realize an IC tag. Furthermore, this communication-improving means or communication-improving method can be also applied to other wireless communication apparatuses. Examples of the wireless communication apparatuses include an antenna, in particular, an antenna in the case where wireless communication is performed near a communication-jamming member, such as a metal plate, a reader, a reader/writer, and the like.

Industrial Applicability

According to the invention, a sheet member or an auxiliary antenna is interposed between an antenna or a tag main body and a communication-jamming member. Thus, the influence of the communication-jamming member on the antenna or the tag main body can be eliminated and suppressed. Moreover, even when the configuration of the communication-jamming member changes, this change does not affect the antenna or the tag main body. Moreover, the resonant portion of the auxiliary antenna functions as an independent antenna, and causes a resonance phenomenon when electromagnetic waves used in communication arrive. Moreover, a groove, an opening or a cutout is disposed in the auxiliary antenna. Thus, when the antenna or the tag main body is disposed near the auxiliary antenna, an area having an intensive magnetic field of a patch antenna that resonates at substantially $\lambda/2$ is used to cause electromagnetic coupling between the auxiliary antenna and the antenna or the tag main body, thereby activating translocation of electromagnetic energy between the auxiliary antenna and the antenna or the tag main body. Furthermore, impedance matching can be performed by simply adjusting the arrangement position of the antenna or the tag main body properly. Accordingly, it is possible not only to simply eliminate the influence of a communication-jamming member, but also to increase the electrical power received (transmitted) by the antenna or the tag main body compared with the case without an auxiliary antenna. Accordingly, even near a communication-jamming member, wireless communication can be preferably performed, and sufficient communication distance can be secured. When the sheet member (the auxiliary antenna) including the conductor layer is provided with the function of an antenna and the function of adjusting impedance matching without requiring a wired connection in this manner, the influence of a communication-jamming member is eliminated, and a large communication-improving effect can be obtained. In the sheet member of the invention, a spacer is disposed so as to be stacked on the auxiliary antenna. Thus, the resonant portion is electrically insulated from the communication-jamming member, the sheet member itself is not affected by the communication-jamming member, and the electromagnetic energy used by the antenna in communication is complemented.

More specifically, the invention is directed to a wireless communication-improving sheet member that improves the wireless communication properties of a wireless IC tag when the wireless IC tag is disposed thereon without a wired connection of an IC chip provided in the wireless IC tag and the auxiliary antenna.

The wireless communication-improving sheet member of the invention is an auxiliary antenna that can improve communication by simply stacking a commercially available wireless IC tag thereon, without depending on the type of attachment target article. The exchange of radio wave signals between the auxiliary antenna and the IC chip of the wireless IC tag is performed simply via the distribution of an electromagnetic field in space, without involving processing such as conductive wiring, wiring connection, soldering, or the like. Here, the wireless communication-improving sheet member can match the impedance and adjust the resonant frequency under these conditions.

A first spacer has an arrangement face on which a wireless IC tag is disposed, and an auxiliary antenna is disposed on the first spacer on the opposite side to the arrangement face. A second spacer is disposed on the opposite side to the first spacer with a first conductor layer interposed therebetween.

A groove, an opening or a cutout is disposed in the first conductor layer of the auxiliary antenna.

Accordingly, the dipole antenna of the wireless IC tag and the auxiliary antenna are electromagnetically coupled via the discontinuous area, and a communication-improving effect of the auxiliary antenna is exerted.

Furthermore, according to the invention, the first conductor layer of the auxiliary antenna includes a plurality of conductor elements that resonate with the electromagnetic waves used in the wireless communication, and the conductor elements are insulated from each other.

When at least one of the first conductor layer and the conductor elements resonates with electromagnetic waves used in wireless communication, wireless communication using the auxiliary antenna can be performed, and a communication-improving effect is exerted.

Furthermore, according to the invention, the first conductor layer of the auxiliary antenna includes a plurality of divided conductor portions arranged in a planar direction or a stacked direction, the conductor portions are insulated from each other, and at least one of the first conductor layer and the conductor portions resonates with electromagnetic waves used in wireless communication.

When a given discontinuous area is disposed in the resonant layer that resonates with electromagnetic waves used in wireless communication, a conductor layer other than the resonant layer is disposed, or a plurality of conductor layers are arranged, a function of adjusting impedance can be provided, a wireless communication band can be expanded, and a communication-improving effect is exerted.

Furthermore, according to the invention, the second spacer is made of a low loss material layer that is non-conductive, and collects and passes electromagnetic waves therethrough, and more specifically, that is one selected from among rubber, a thermoplastic elastomer, various types of plastic, wood, and paper, and a porous material thereof.

Furthermore, according to the invention, the wireless communication-improving sheet member further comprises a second conductor layer on the auxiliary antenna on the opposite side to the second spacer. Accordingly, the influence of the arrangement position of the wireless communication-improving sheet member (also including the type of the material) can be reduced.

Furthermore, according to the invention, the wireless communication-improving sheet member further comprises a second conductor layer on the auxiliary antenna on the opposite side to the second spacer, and the second conductor layer is larger than the conductor layer included in the auxiliary antenna. Accordingly, the influence of the arrangement position of the wireless communication-improving sheet member (also including the type of the material) can be more reliably reduced, and the directionality of radio waves can be controlled.

Furthermore, according to the invention, at least one of the groove, the opening or the cutout is disposed so as to face at least an IC chip or a reactance loading portion included in the wireless IC tag when the wireless IC tag is disposed thereon.

Accordingly, the influence of the auxiliary antenna as a conductor material can be reduced, the function of adjusting impedance is improved, and the communication-improving effect can be further improved.

Furthermore, according to the invention, the groove, the opening or the cutout is disposed such that the auxiliary antenna resonates with electromagnetic waves used in wireless communication.

Accordingly, the communication-improving effect of the auxiliary antenna can be further improved.

Furthermore, according to the invention, at least part of an outline shape of the first conductor layer or the groove, the opening or the cutout is curved.

Accordingly, the antenna properties are stable regardless of the angular and positional relationship of an antenna portion of the conductor layer, the discontinuous area, or the like.

Furthermore, according to the invention, part or the whole of an outer surface of the wireless communication-improving sheet member is coated with a dielectric material.

Accordingly, the influence of unnecessary electromagnetic waves from the outside and the influence of the surrounding environment (humidity, temperature, pressure, and the like) is reduced, and the communication-improving effect can be further improved.

Furthermore, according to the invention, at least one of the first spacer, the second spacer, and the coating dielectric material is made of a low loss material layer that is non-conductive, and collects and passes electromagnetic waves therethrough.

When a low loss material is used, energy loss at the sheet member, the auxiliary antenna, and the wireless IC tag is reduced, and the communication-improving effect can be further improved.

Furthermore, according to the invention, at least one of the first spacer and the second spacer is made of foam.

When foam is used, a light and thin wireless communication-improving sheet member with low energy loss can be provided.

Furthermore, according to the invention, the wireless communication-improving sheet member can be attached to an attachment target article using the tackiness or adhesiveness of at least one of the arrangement face and the face on the opposite side to the arrangement face, or using fixing means.

Accordingly, the wireless IC tag can be easily attached, stuck to a target product, and fixed.

Moreover, according to the invention, there is provided an IC tag for wireless communication, wherein the wireless IC tag is disposed on the arrangement face of the wireless communication-improving sheet member, or an IC chip is embedded in the wireless communication-improving sheet member or the auxiliary antenna.

Since the wireless communication-improving sheet member is integrated with the wireless IC tag, wireless communication can be performed regardless of the arrangement position or the stuck position.

Moreover, according to the invention, it is possible to realize a radio-wave-type antenna that improves wireless communication near a communication-jamming member, by using the wireless communication-improving sheet member.

Moreover, according to the invention, it is possible to realize a wireless communication system that prevents a reading error or a reading failure from occurring, by using at least the wireless IC tag or the antenna.

The invention claimed is:

1. A wireless communication-improving sheet member that is used between a wireless IC tag and a communication jamming member at the time of wireless communication with electric waves of a UHF band, an SHF band and an EHF band using an antenna for performing radio-wave-type communication near the communication jamming member, and that improves wireless communication properties of the wireless IC tag when the wireless IC tag is disposed on an arrangement face without a wired connection of an IC chip provided in the wireless IC tag and an auxiliary antenna, comprising:
   a first spacer having the arrangement face, the first spacer being made of a non-conductive material;
   the auxiliary antenna disposed on the first spacer on an opposite side to the arrangement face, the auxiliary antenna having a first conductor layer including a portion resonating with electromagnetic waves used in the wireless communication;
   a second spacer disposed on the auxiliary antenna on an opposite side to the first spacer with the first conductor layer interposed therebetween, the first spacer, the auxiliary antenna and the second spacer being stacked one on top of another; and
   a groove, an opening or a cutout being disposed in the first conductor layer of the auxiliary antenna, wherein
      a first side of the first conductor layer is in direct contact with a surface of the first spacer that is opposite the arrangement face and a second side of the first conductor layer is in direct contact with a surface of the second spacer opposite the arrangement face,
      the groove, the opening or the cutout passes through the first spacer and the auxiliary antenna in a stacked direction of the first spacer, the auxiliary antenna and the second spacer, and
      the second spacer forms a bottom of the groove, the opening or the cutout.

2. The wireless communication-improving sheet member of claim 1, wherein the first conductor layer of the auxiliary antenna includes a plurality of conductor elements that resonate with the electromagnetic waves used in the wireless communication, and the conductor elements are insulated from each other.

3. The wireless communication-improving sheet member of claim 1, wherein the first conductor layer of the auxiliary antenna includes a plurality of divided conductor portions arranged in a planar direction or a stacked direction, the conductor portions are insulated from each other, and at least one of the first conductor layer and the conductor portions resonates with electromagnetic waves used in the wireless communication.

4. The wireless communication-improving sheet member of claim 1, wherein the second spacer is made of a low loss material layer that is non-conductive, and collects and passes electromagnetic waves therethrough, which is one selected from among rubber, a thermoplastic elastomer, various types of plastic, wood, and paper, and a porous material thereof.

5. The wireless communication-improving sheet member of claim 1, further comprising a second conductor layer on the auxiliary antenna on an opposite side to the second spacer.

6. The wireless communication-improving sheet member of claim 1, further comprising a second conductor layer on the auxiliary antenna on an opposite side to the second spacer, wherein the second conductor layer is larger than the first conductor layer included in the auxiliary antenna.

7. The wireless communication-improving sheet member of claim 1, wherein at least one of the groove, the opening or the cutout is disposed so as to face at least an IC chip or reactance loading portion provided in the wireless IC tag when the wireless IC tag is disposed thereon.

8. The wireless communication-improving sheet member of claim 1, wherein at least one of the groove, the opening or the cutout is disposed so as to resonate with electromagnetic waves used in the wireless communication.

9. The wireless communication-improving sheet member of claim 1, wherein at least part of an outline shape of the first conductor layer or the groove, the opening or the cutout is curved.

10. The wireless communication-improving sheet member of claim 1, wherein part or whole of an outer surface of the wireless communication-improving sheet member is coated with a dielectric material.

11. The wireless communication-improving sheet member of claim 10, wherein at least one of the first spacer and the coating dielectric material is made of a low loss material layer that is non-conductive, and collects and passes electromagnetic waves therethrough.

12. The wireless communication-improving sheet member of claim 1, wherein at least one of the first spacer and the second spacer is made of foam.

13. The wireless communication-improving sheet member of claim 1, wherein the wireless communication-improving sheet member can be attached to an attachment target article using tackiness or adhesiveness of at least one face of the wireless communication-improving sheet member, or using fixing means.

14. A wireless IC tag, disposed without a wired connection on the arrangement face of the wireless communication-improving sheet member of claim 1, or comprising an IC chip embedded in the wireless communication-improving sheet member of claim 1.

15. A radio-wave-type antenna using the wireless communication-improving sheet member of claim 1.

16. A wireless communication system using the wireless IC tag of claim 14.

17. The wireless communication-improving sheet member of claim 2, wherein at least one of the groove, the opening or the cutout is disposed so as to face at least an IC chip or reactance loading portion provided in the wireless IC tag when the wireless IC tag is disposed thereon.

18. The wireless communication-improving sheet member of claim 3, wherein at least one of the groove, the opening or the cutout is disposed so as to face at least an IC chip or reactance loading portion provided in the wireless IC tag when the wireless IC tag is disposed thereon.

19. The wireless communication-improving sheet member of claim 4, wherein at least one of the groove, the opening or the cutout is disposed so as to face at least an IC chip or reactance loading portion provided in the wireless IC tag when the wireless IC tag is disposed thereon.

20. A wireless communication system using the antenna of claim 15.

\* \* \* \* \*